US012246400B2

(12) United States Patent
Oliveira E Silva

(10) Patent No.: US 12,246,400 B2
(45) Date of Patent: Mar. 11, 2025

(54) PIPELINE SYSTEM OF PIPE SECTIONS WITH PRE-ASSEMBLED INSULATING WELD BACKING RINGS AND METHOD OF MAKING SAME

(71) Applicant: LPS IP, LLC, Rancho Cucamonga, CA (US)

(72) Inventor: Jose Anisio de Oliveira E Silva, Belo Horizonte-MG (BR)

(73) Assignee: LPS IP LLC, Rancho Cucamonga, CA (US)

(*) Notice: Subject to any disclaimer, the term of this patent is extended or adjusted under 35 U.S.C. 154(b) by 1034 days.

(21) Appl. No.: 16/644,072

(22) PCT Filed: Sep. 4, 2018

(86) PCT No.: PCT/BR2018/050315
§ 371 (c)(1),
(2) Date: Mar. 3, 2020

(87) PCT Pub. No.: WO2019/041016
PCT Pub. Date: Mar. 7, 2019

(65) Prior Publication Data
US 2020/0398362 A1    Dec. 24, 2020

(30) Foreign Application Priority Data

Sep. 4, 2017    (BR) .......................... 1020170189104

(51) Int. Cl.
*B23K 9/035*    (2006.01)
*B23K 9/028*    (2006.01)
(Continued)

(52) U.S. Cl.
CPC .......... *B23K 9/0358* (2013.01); *B23K 9/0282* (2013.01); *B23K 11/163* (2013.01);
(Continued)

(58) Field of Classification Search
CPC ............... F16L 13/0218; F16L 13/0227; F16L 13/0263; F16L 58/181; F16L 13/0236; B23K 9/0358; B23K 9/0356
(Continued)

(56) References Cited

U.S. PATENT DOCUMENTS 2,188,925 A    2/1940    Ronay
2,372,712 A    4/1945    Crawford
(Continued)

FOREIGN PATENT DOCUMENTS

AR          034477 A1    2/2004
AU          5373290      10/1990
(Continued)

OTHER PUBLICATIONS

Matweb.com, "Thermal Ceramics Kaowool Blanket", "https://www.matweb.com/search/datasheet_print.aspx?matguid=cb830e74bc69422aa560a7b57494955a".*
(Continued)

*Primary Examiner* — Zachary T Dragicevich
*Assistant Examiner* — Alexander T Rufrano
(74) *Attorney, Agent, or Firm* — Victor H. Segura

(57) ABSTRACT

A pre-assembled insulated weld backing ring for a tubular section of the pipeline. The weld backing ring includes a metal cylinder and an insulation layer. The metal cylinder has a ring-shaped anterior portion and a ring-shaped raised posterior portion with a step therebetween. The posterior portion has a larger diameter than the anterior portion to define an insulation pocket. The insulation layer is positioned on the external surface of the metal cylinder. The insulation layer is made of an insulated material positioned in the insulation pocket to define a protective barrier to protect the tubular section during welding. The weld backing ring may also include a second metal cylinder positioned on (Continued)

the insulation layer. The weld backing ring may be preassembled by applying a tubular metal section material to a sheet of metal and rolling the sheet of metal to form the metal cylinder.

12 Claims, 14 Drawing Sheets

(51) Int. Cl.
   *B23K 11/16* (2006.01)
   *F16L 13/02* (2006.01)
   *F16L 58/18* (2006.01)
(52) U.S. Cl.
   CPC ........ *F16L 13/0236* (2013.01); *F16L 13/0263* (2013.01); *F16L 13/0272* (2013.01); *F16L 58/181* (2013.01)
(58) Field of Classification Search
   USPC .................................................. 285/288.11
   See application file for complete search history.

(56) References Cited

U.S. PATENT DOCUMENTS

| | | |
|---|---|---|
| 2,646,995 A | 7/1953 | Thompson |
| 2,764,426 A | 9/1956 | Von Ahrens |
| 2,794,758 A | 6/1957 | Harper et al. |
| 2,895,747 A | 7/1959 | Bland et al. |
| 3,132,236 A | 5/1964 | Deininger |
| 3,142,499 A | 7/1964 | Lang |
| 3,192,612 A | 7/1965 | Elliott et al. |
| 3,195,931 A | 7/1965 | Braunagel |
| 3,217,922 A | 11/1965 | Glasgow |
| 3,235,291 A | 2/1966 | Jacoby |
| 3,266,820 A | 8/1966 | Leborgne et al. |
| 3,284,108 A | 11/1966 | West |
| 3,325,191 A | 6/1967 | Yates |
| 3,453,004 A | 7/1969 | Toelke et al. |
| 3,467,410 A | 9/1969 | Chandler |
| 3,508,766 A | 4/1970 | Kessler et al. |
| 3,516,689 A | 6/1970 | Binford et al. |
| 3,537,731 A | 11/1970 | Reddy |
| 3,653,688 A | 4/1972 | Sakakibara |
| 3,817,805 A | 6/1974 | Surikov et al. |
| 3,890,483 A | 6/1975 | Webster |
| 3,955,834 A | 5/1976 | Ahlrot |
| 3,965,555 A * | 6/1976 | Webster ............... B23K 11/163 285/55 |
| 3,972,466 A * | 8/1976 | Keith ................... B23K 9/0356 228/50 |
| 4,182,519 A | 1/1980 | Wilson |
| 4,277,091 A | 7/1981 | Hunter |
| 4,400,019 A | 8/1983 | Fruck |
| 4,611,833 A | 9/1986 | Lescaut |
| 4,619,470 A | 10/1986 | Overath et al. |
| 4,635,967 A * | 1/1987 | Stephenson ............. E21B 17/08 285/47 |
| 4,640,532 A | 2/1987 | Pope |
| 4,768,278 A | 9/1988 | Pickering et al. |
| 4,913,465 A | 4/1990 | Abbema et al. |
| 5,009,737 A | 4/1991 | Lescaut |
| 5,009,797 A | 4/1991 | Penny et al. |
| 5,052,608 A | 10/1991 | McClure |
| 5,104,152 A * | 4/1992 | Galfant ................ F16L 58/181 285/55 |
| 5,114,190 A | 5/1992 | Chalmers |
| 5,163,715 A | 11/1992 | Rickard et al. |
| 5,219,187 A | 6/1993 | Mikitka |
| 5,282,652 A | 2/1994 | Werner |
| 5,346,261 A | 9/1994 | Abbema |
| 5,348,211 A | 9/1994 | White et al. |
| 5,405,171 A | 4/1995 | Allen et al. |
| 5,480,196 A | 1/1996 | Adams, Jr. |
| 5,547,228 A | 8/1996 | Abbema et al. |
| 5,566,984 A | 10/1996 | Abbema et al. |
| 5,566,986 A | 10/1996 | Allen et al. |
| 5,584,512 A | 12/1996 | Carstensen |
| 5,634,672 A | 6/1997 | Stack et al. |
| 5,685,572 A | 11/1997 | Linton et al. |
| 5,779,276 A | 7/1998 | Allen |
| 5,863,078 A | 1/1999 | Ball |
| 5,964,981 A | 10/1999 | Nelson et al. |
| 5,984,370 A | 11/1999 | Lewis |
| 5,992,897 A | 11/1999 | Hill et al. |
| 6,226,855 B1 | 5/2001 | Maine |
| 6,294,042 B1 | 9/2001 | Nelson et al. |
| 6,322,111 B1 | 11/2001 | Brady |
| 6,357,802 B1 | 3/2002 | Nozato et al. |
| 6,375,226 B1 | 4/2002 | Dickinson et al. |
| 6,719,186 B2 | 4/2004 | Mudge, Jr. et al. |
| 6,739,632 B1 | 5/2004 | Thomas et al. |
| 6,863,313 B1 | 3/2005 | Delange et al. |
| 6,926,283 B2 | 8/2005 | Janoff et al. |
| 7,080,667 B2 | 7/2006 | McIntyre |
| 7,344,161 B2 | 3/2008 | Howard et al. |
| 7,431,341 B2 | 10/2008 | McIntyre |
| 7,722,085 B2 | 5/2010 | Pionetti |
| 7,908,732 B2 * | 3/2011 | Alliot ................... F16L 58/181 29/523 |
| 8,186,685 B2 | 5/2012 | Martin et al. |
| 8,256,089 B2 | 9/2012 | Pionetti |
| 8,397,766 B2 | 3/2013 | Rosen |
| 8,398,119 B2 | 3/2013 | Kenworthy |
| 8,596,692 B1 | 12/2013 | Gourlay |
| 8,622,094 B2 * | 1/2014 | Dorsch ................... F16L 58/08 285/55 |
| 8,714,597 B2 | 5/2014 | Venable et al. |
| 8,794,637 B2 | 8/2014 | Martin et al. |
| 8,942,552 B2 * | 1/2015 | Pionetti ................ B29C 66/634 392/479 |
| RE45,518 E | 5/2015 | Martin et al. |
| 9,377,148 B2 | 6/2016 | Barnes |
| 9,599,257 B2 * | 3/2017 | Raber ................. F16L 13/0227 |
| 9,915,383 B2 | 3/2018 | Compton et al. |
| 9,982,814 B1 | 5/2018 | Carstensen |
| 10,047,892 B2 | 8/2018 | Barnes |
| 10,274,108 B2 | 4/2019 | Barnes |
| 10,533,690 B2 | 1/2020 | Barnes |
| 10,562,235 B2 | 2/2020 | Pionetti et al. |
| 11,047,513 B2 | 6/2021 | Barnes |
| 11,092,262 B2 | 8/2021 | Chalmers et al. |
| 11,338,526 B2 | 5/2022 | Pionetti et al. |
| 11,572,967 B2 * | 2/2023 | Yakovchev ......... F16L 13/0227 |
| 2002/0157718 A1 | 10/2002 | Mason |
| 2004/0070199 A1 * | 4/2004 | Trivelli ............... F16L 13/0263 285/55 |
| 2005/0189028 A1 | 9/2005 | Burkes |
| 2005/0225089 A1 | 10/2005 | Ben-Horin |
| 2005/0246883 A1 | 11/2005 | Alliot et al. |
| 2006/0145479 A1 | 7/2006 | McIntyre |
| 2007/0284872 A1 | 12/2007 | Pionetti |
| 2010/0207380 A1 | 8/2010 | Venable et al. |
| 2011/0094613 A1 | 4/2011 | Rosen |
| 2011/0193339 A1 | 8/2011 | Kenworthy |
| 2013/0240076 A1 | 9/2013 | Van Der Graaf |
| 2013/0292936 A1 | 11/2013 | Rosen |
| 2014/0047176 A1 | 2/2014 | Poddar |
| 2014/0103638 A1 | 4/2014 | Compton et al. |
| 2014/0116518 A1 | 5/2014 | Burkes |
| 2014/0252757 A1 | 9/2014 | Raber |
| 2015/0047176 A1 | 2/2015 | Li |
| 2015/0260318 A1 | 9/2015 | Goess-Saurau et al. |
| 2016/0298811 A1 | 10/2016 | Burkes |
| 2017/0045162 A1 | 2/2017 | Raber |
| 2019/0316721 A1 | 10/2019 | Barnes |

(56) References Cited

U.S. PATENT DOCUMENTS

| | | | |
|---|---|---|---|
| 2022/0049800 A1* | 2/2022 | Hallot | F16L 58/1009 |
| 2022/0136624 A1 | 5/2022 | Metcalf et al. | |

FOREIGN PATENT DOCUMENTS

| | | | |
|---|---|---|---|
| BR | 7402792 | 12/1974 | |
| BR | 0301867 B1 | 10/2011 | |
| BR | 112015022847 A8 | 2/2020 | |
| CA | 1006016 | 3/1977 | |
| CA | 1050075 | 3/1979 | |
| CA | 2382454 | 1/2002 | |
| CA | 2431459 A1 | 12/2003 | |
| CA | 2817985 A1 | 5/2012 | |
| CA | 2904609 A1 | 10/2014 | |
| CA | 2460297 | 1/2016 | |
| CN | 101694261 A | 4/2010 | |
| CN | 103899857 A * | 7/2014 | F16L 13/0227 |
| DE | 660158 | 5/1938 | |
| DE | 1872620 U | 5/1963 | |
| DE | 2531932 A1 | 1/1977 | |
| DE | 3315819 A1 | 10/1984 | |
| EP | 0366299 A2 | 5/1990 | |
| EP | 0389462 | 9/1990 | |
| EP | 137189 | 3/1991 | |
| EP | 1371891 B1 | 12/2003 | |
| FR | 2416764 | 9/1979 | |
| FR | 2438788 | 5/1980 | |
| GB | 410120 | 5/1934 | |
| GB | 410196 | 5/1934 | |
| GB | 722070 A * | 1/1955 | B23K 9/035 |
| GB | 1022510 | 3/1966 | |
| GB | 1384614 | 2/1975 | |
| GB | 1444225 | 7/1976 | |
| GB | 1451190 | 9/1976 | |
| GB | 1480061 | 7/1977 | |
| GB | 1533233 | 11/1978 | |
| GB | 2298689 | 9/1996 | |
| GB | 2481065 | 12/2011 | |
| GB | 2588919 | 5/2021 | |
| OA | 12986 | 10/2006 | |
| RU | 2023930 | 11/1994 | |
| RU | 2154221 | 8/2000 | |
| RU | 2157479 | 10/2000 | |
| RU | 20361 U1 | 10/2001 | |
| RU | 2232334 | 7/2004 | |
| RU | 2236628 | 9/2004 | |
| RU | 2503873 | 1/2014 | |
| WO | 9014544 | 11/1990 | |
| WO | 1990014544 | 11/1990 | |
| WO | WO9626384 | 8/1996 | |
| WO | WO9821513 | 5/1998 | |
| WO | WO0201103 A1 | 1/2002 | |
| WO | WO2012069105 A1 | 5/2002 | |
| WO | 03062691 | 7/2003 | |
| WO | WO03062691 A1 | 7/2003 | |
| WO | WO2004011840 | 2/2004 | |
| WO | WO2004015321 | 2/2004 | |
| WO | WO2005019719 A1 | 3/2005 | |
| WO | WO2006109015 A1 | 10/2006 | |
| WO | WO2009048772 A1 | 4/2009 | |
| WO | WO2010041016 A1 | 4/2010 | |
| WO | WO2013136062 A1 | 9/2013 | |
| WO | WO2014164862 | 10/2014 | |
| WO | WO2016001622 A1 | 1/2016 | |
| WO | WO2016185228 A1 | 11/2016 | |

OTHER PUBLICATIONS

International Search Report and Written Opinion issued in PCT Application No. PCT/BR2018/050315 mailed Jan. 29, 2019, pp. 1-9.
Written Opinion of International Preliminary Examination Authority issued in PCT Application No. PCT/BR2018/050315 mailed Sep. 4, 2019, pp. 1-5.
International Search Report and Written Opinion issued in PCT Application No. PCT/US2014/023652 mailed Aug. 11, 2014, pp. 1-11.
Marubeni-Itochu Tubulars America website, www.mitube.com/products.linepipe-2, retrieved on Mar. 2, 2020, p. 1.
Accuratus Corporation website, www.accuratus.com, retrieved on Mar. 2, 2020, pp. 1-4.
QA Weld Tech Ltd., "Introducing WeldLink," www.qaweldtech.co.uk, Middlesbrough, UK, pp. 1-14.

* cited by examiner

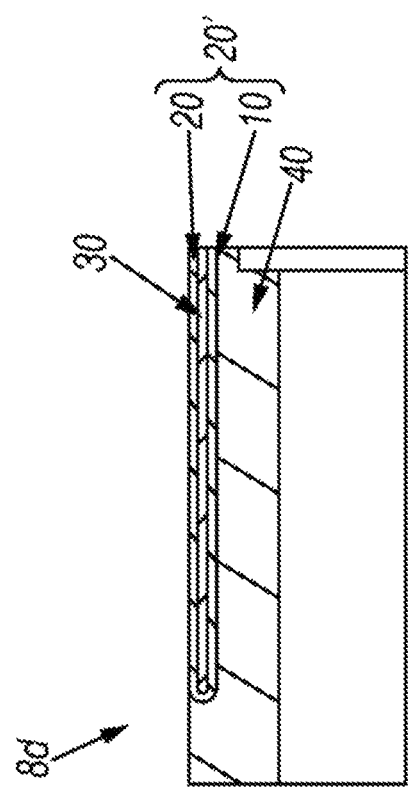
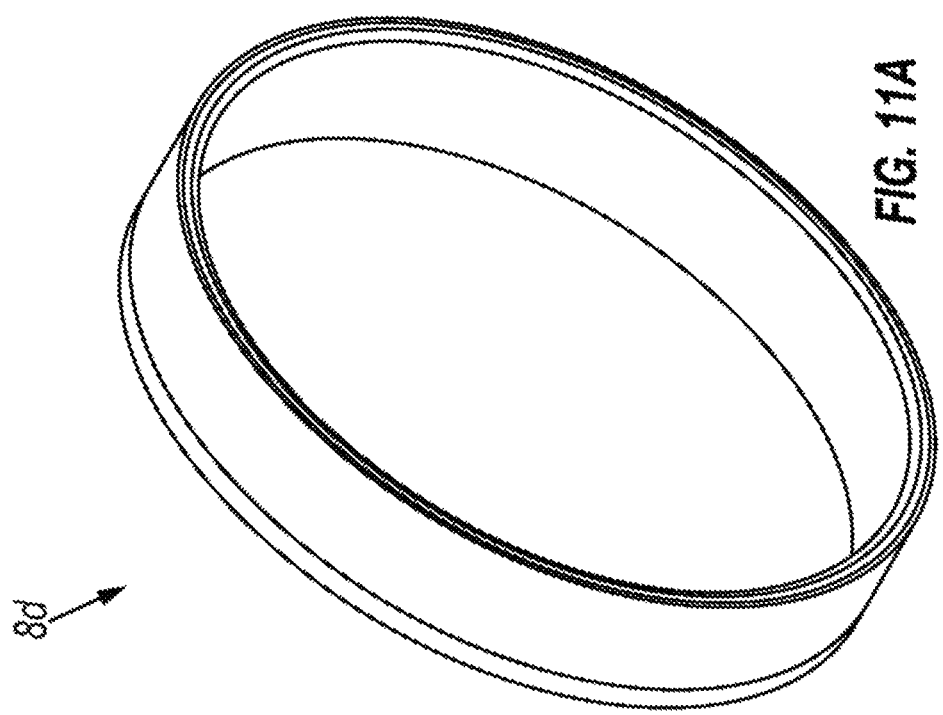

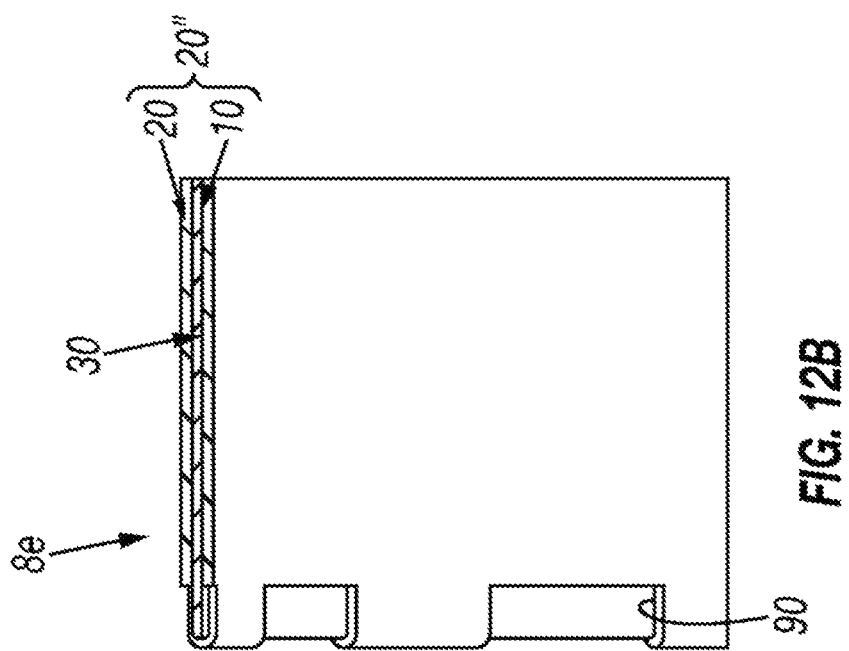
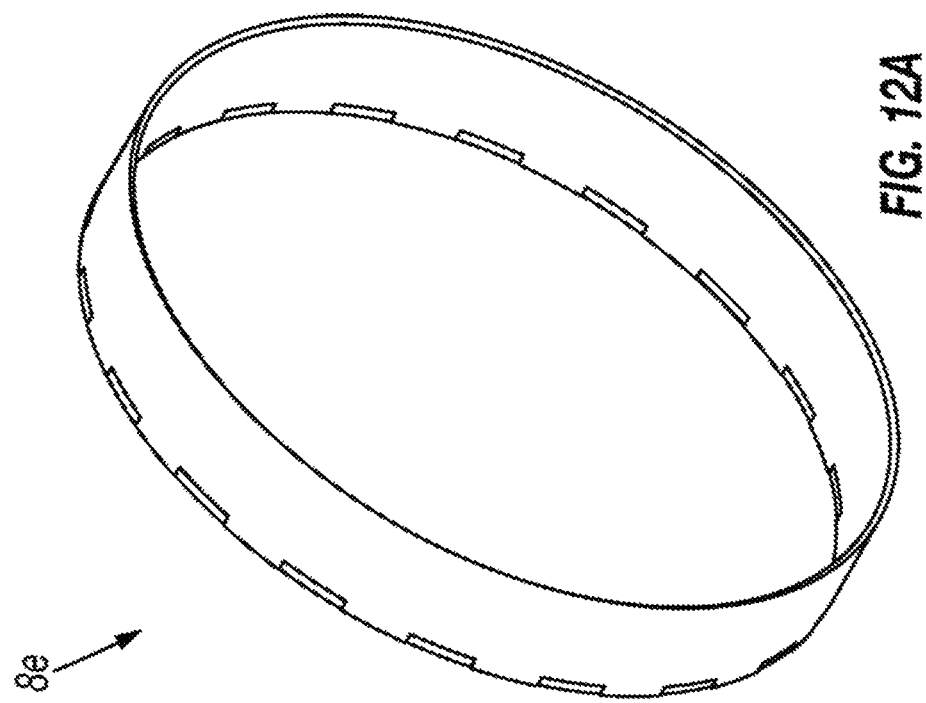

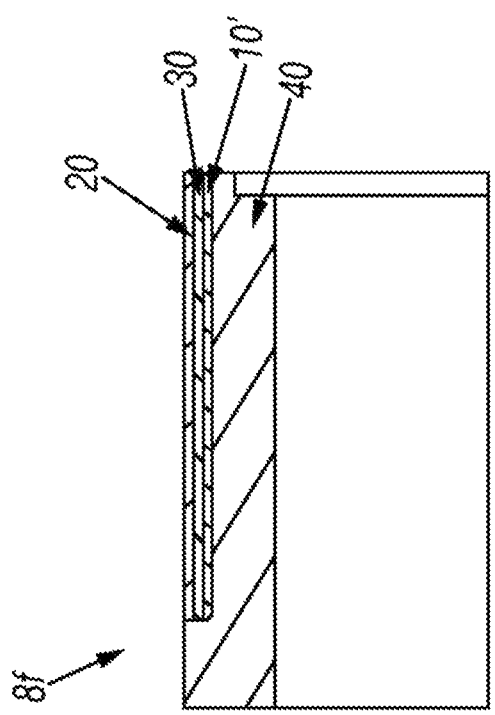
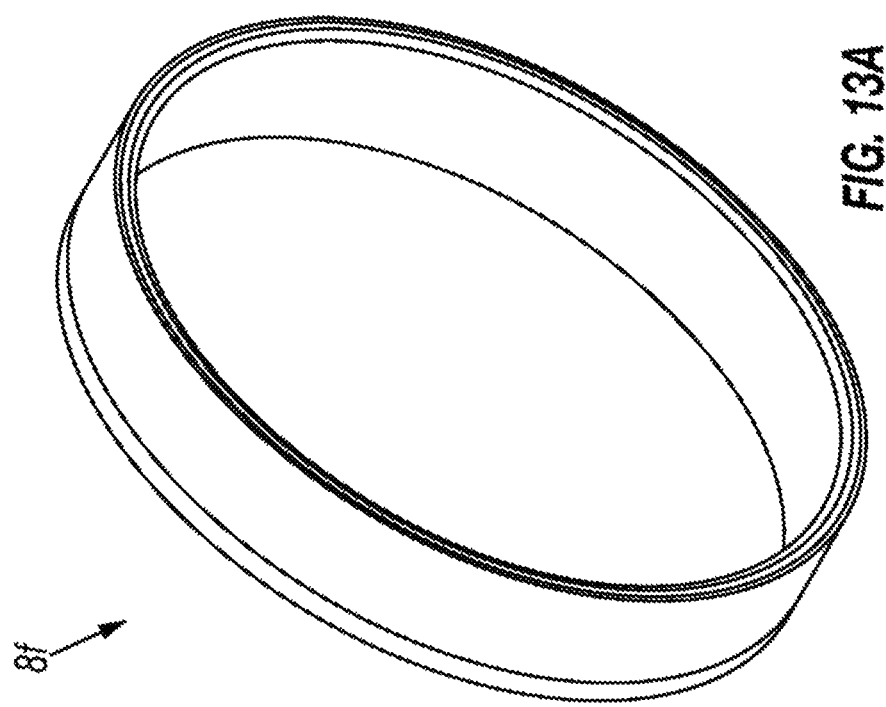
FIG. 13A
FIG. 13B

1400 - A METHOD OF WELDING ADJACENT PIPE SECTIONS OF A PIPELINE

- 91 - PRE-ASSEMBLING A WELD BACKING RING BY:
  - 91a - PROVIDING A SHEET OF METAL
  - 91b - APPLYING AN INSULATED MATERIAL ONTO THE SHEET OF METAL
  - 91c - ROLLING THE SHEET OF METAL INTO A FIRST METAL CYLINDER WITH THE THERMALLY INSULATED MATERIAL ON AN EXTERNAL SURFACE THEREOF, THE THERMALLY INSULATED MATERIAL FORMING A THERMAL RING ABOUT THE METAL CYLINDER
- 96a - OPTIONALLY APPLYING A SECOND SHEET OF METAL ONTO THE THERMALLY INSULATED MATERIAL ON THE EXTERNAL SURFACE OF THE THERMAL RING TO FORM A SECOND METAL CYLINDER AND
- 96b - OPTIONALLY INTEGRATING A POSTERIOR END OF THE FIRST METAL CYLINDER WITH A POSTERIOR END OF THE SECOND METAL CYLINDER.
- 96c - OPTIONALLY FOLDING OVER A POSTERIOR PORTION OF THE SHEET OF METAL ONTO THE EXTERNAL SURFACE OF THE SHEET OF METAL, AND ROLLING THE FOLDED POSTERIOR PORTION INTO A RAISED RING ALONG THE EXTERNAL SURFACE OF THE FIRST METAL CYLINDER.
- 96d - OPTIONALLY FOLDING OVER A POSTERIOR PORTION OF THE SHEET OF METAL ONTO THE EXTERNAL SURFACE OF THE SHEET OF METAL AND ROLLING THE FOLDED POSTERIOR PORTION INTO A SECOND METAL CYLINDER
- 96e - OPTIONALLY BONDING TOGETHER AT LEAST TWO OF: THE FIRST METAL CYLINDER, THE INSULATING RING, A LINER SEALING ELEMENT, A SECOND METAL CYLINDER, AND THE TUBULAR SECTION
- 92 - INSULATING A TUBULAR SECTION OF THE PIPE SECTION FROM WELDING HEAT BY:
  - 92a - INSERTING THE PRE-ASSEMBLED WELD BACKING RING INTO AN END OF THE TUBULAR SECTION
  - 92b - POSITIONING AN ANTERIOR END OF THE FIRST METAL CYLINDER AND AN ANTERIOR END OF THE THERMAL RING FLUSH WITH THE END OF THE TUBULAR SECTION
  - 92c - SECURING THE PRE-ASSEMBLED WELD BACKING RING TO AN INTERNAL SURFACE OF THE TUBULAR SECTION
- 94 - POSITIONING THE ENDS OF EACH OF THE ADJACENT PIPES TOGETHER WITH THE ANTERIOR ENDS OF THE PRE-ASSEMBLED WELD BACKING RING OF EACH OF THE ADJACENT PIPES IN CONTACT
- 95 - FORMING A WELD BETWEEN THE ADJACENT PIPE SECTION BY APPLYING THE WELDING HEAT TO EACH OF THE ADJACENT PIPES SECTIONS.

*FIG. 14*

PIPELINE SYSTEM OF PIPE SECTIONS WITH PRE-ASSEMBLED INSULATING WELD BACKING RINGS AND METHOD OF MAKING SAME

CROSS-REFERENCE TO RELATED APPLICATIONS

This application claims priority to Brazilian Patent Application No. BR1020170189104, the entire contents of which are hereby incorporated by reference herein.

BACKGROUND

The present disclosure relates generally to pipelines. In particular, the present disclosure relates to pipeline pipe sections and pipe section connections (or joints).

Systems have been used throughout the years to join two or more tubular metal sections together. For example, butt welding may be used for building piping systems and medium to high pressure pipelines for fluid transport and distribution from individual tubular sections.

A construction culture of piping systems and pipelines has evolved around systems and techniques for producing high quality butt welds of tubular metal sections in the field. Electric arc welding in any of its forms may be used as a foundation of the construction of piping systems and pipelines.

In oil production, mining, and other industries, there are pipelines intended to transport abrasive or corrosive media. These pipelines may be internally lined with heat-sensitive materials, such as polytetrafluoroethylene (PTFE), high density polyethylene (HDPE), polyurethane or rubber, to protect the parent metal of the pipeline from erosion or corrosion. In these cases, mechanical joints may be used, as the high temperatures that result from the welding process may damage the internal lining, degrading or destroying its erosion resistance or corrosion protection properties.

The pipeline industry has been looking for a solution to overcome deficiencies of existing pipeline systems. Various solutions have been proposed, with different degrees of success. In some cases, pipe sections have been modified to facilitate welding between the pipes. Examples of pipeline welding systems and modification in pipe sections are shown in Patent/Application Nos. U.S. Pat. Nos. 3,508,766, 5,104,152, 3,965,555, US2013/0292936, and U.S. Pat. No. 9,599,257, the entire contents of which are hereby incorporated by reference herein.

Despite advancements in pipeline technology, there remains a clear and outstanding demand for a simple and cost-effective techniques for forming durable and operable pipe section joints for pipelines without damaging the pipe sections and/or materials in the pipe sections.

SUMMARY

This disclosure relates to a weld backing ring (e.g., composite butt weld backing ring) intended to be inserted into each one of the abutting ends of a first tubular metal section and a second tubular metal section, comprising a first metal ring and an insulated ring of tubular metal section insulating, high temperature resistant material, disposed on the external surface of the first metal ring, the plane of the anterior face of the insulation layer essentially contained into the plane of the anterior face of the first metal ring. The internal surface and the posterior face of the first metal ring are prepared to receive a pipe liner (or layer of lining material) which has a resistance to corrosive and erosive processes as well as to high temperatures, greater or equal to that of the pipe liner of the tubular section in which the weld backing ring will be inserted.

The disclosure also relates to a system of pipe sections (tubulars) joined together to form a pipeline. The system is generated by fabricating butt-welded joints of tubular sections of the pipe sections which are internally lined with heat-sensitive materials and employs two weld backing rings, inserted one on each of the abutting ends of the tubular metal sections to be welded. Each one of the weld backing rings is positioned into the end of the respective tubular section in such a way that the contact between the abutting anterior faces of said rings establish the specified weld root gap for the adopted welding process.

In an aspect, the present disclosure relates to a weld backing ring and a system that employs said ring for fabricating butt-welded joints of tubular metal sections internally lined with heat-sensitive materials. The tubular sections to be welded may be industry standard carbon steel tubular sections, internally lined with a ring liner made of natural or synthetic rubber, polytetrafluorethylene (PTFE), polypropylene, high density polyethylene (HDPE) or polyurethane, although those of skill in the art may recognize uses for the system with other types of tubular sections and with other types of internal linings.

An aspect of the present disclosure relates to a weld backing ring, intended to be coaxially and adjustingly inserted into each one of the ends of the tubular sections to be welded, comprising: (i) a first metal cylinder (or ring or first metal right circular hollow cylinder) made from a material metallurgically similar to the material of said tubular sections; and (ii) an insulation layer of tubular metal section insulating, high temperature resistant material, disposed on the external surface of the first metal cylinder, the plane of the anterior face of the insulation layer being essentially contained within the plane of the anterior face of the first metal cylinder. The internal surface and the posterior face of the first metal cylinder are prepared to receive a layer of the ring liner (lining material) which has a resistance to corrosive and erosive processes as well as to high temperatures, greater or equal to that of the pipe liner (layer of internal liner material of the tubular section) in which the weld backing ring will be inserted. This preparation may include the construction of the first metal cylinder with the employment of expanded or perforated metal sheets, which provide a tridimensional anchor pattern for the layer ring liner.

The posterior end of the first metal cylinder is provided with a raised or outwardly extending portion, essentially of the same thickness as the insulation layer, which contacts the interior surface of the tubular section. The raised or outwardly extending portion of the posterior end of the first metal cylinder may be structurally anchored to the internal surface of the tubular section through spot welding, brazing, high-strength adhesives or any other method.

The insulation layer of tubular metal section insulating, high temperature resistant material may be built of ceramic fiber, fiberglass, rock wool or other materials with low tubular metal section conductivity and high melting point, such as, CERATEX® 3120G Ceramic Fiber Tape or similar, CERATEX® 3170G ceramic fiber paper or similar, MCALLISTER MILLS™ style SPG 650 MAXSIL® silica tape, MCALLISTER MILLS™ style SPG 1250 MAXSIL® silica tape or similar, or any other materials with low tubular metal section conductivity and high melting point. The insulation layer and/or the insulating, high temperature resistant material may be impregned with high temperature resistant resins, lithium silicate, sodium silicate, potassium silicate or other refractory binders.

The internal surface of the insulation layer and/or the insulating, high temperature resistant material may be structurally anchored to an external surface of the first metal cylinder with a bonding material, such as an adhesive, a high-strength adhesive, high temperature resistant resins, lithium silicate, sodium silicate, potassium silicate, other refractory adhesives or any other method.

The external surface of the insulation layer and/or the insulating, high temperature resistant material may be structurally anchored or otherwise connected to the internal surface of the tubular section with an adhesive such as a high-strength adhesive, high temperature resistant resins, lithium silicate, sodium silicate, potassium silicate, other refractory adhesives or any other method.

The insulation layer (tubular metal section insulating, high temperature resistant material) may be applied to the external surface of the first metal cylinder by spraying, brushing, coating, or the like to a suitable thickness. Preferably, an aluminum oxide, Al2O3 (such as is available from ACCURATUS CORPORATION™ of Phillipsburg, N.J.), coating is applied by a plasma spray process. Upon curing, drying or other finishing, the tubular metal section insulating, high temperature resistant material is anchored or otherwise connected to the first metal cylinder.

Another aspect of the present disclosure relates to a weld backing ring, intended to be coaxially and adjustingly inserted into each one of the ends of the tubular sections to be welded, comprising: (i) a first metal cylinder made from material metallurgically similar to the material of said tubular sections; (ii) an insulation layer of tubular metal section insulating, high temperature resistant material, disposed on the external surface of the first metal cylinder, the plane of the anterior face of the insulation layer of tubular metal section insulating material being essentially contained within the plane of the anterior face of the first metal cylinder; and (iii) a second metal cylinder (ring), made from material metallurgically similar to the material of the tubular sections to be welded, disposed on the external surface of the insulation layer, the plane of the anterior face of the second metal cylinder being essentially contained within the plane of the anterior face of the first metal cylinder and of the insulation layer. The internal surface and the posterior face of the first metal cylinder are prepared to receive the ring liner (a layer of lining material) which has a resistance to corrosive and erosive processes as well as to high temperatures greater or equal to that of pipe liner (or layer of liner material) of the tubular section in which the weld backing ring will be inserted. This preparation may include the construction of the first metal cylinder with the employment of expanded or perforated metal plates, which provide a tridimensional anchor pattern for the layer of internal liner material.

For the weld backing rings built in accordance with the disclosure, the external surface of the insulation layer may be structurally anchored to the internal surface of the second metal cylinder by various bonding means, such as of high-strength adhesives, high temperature resistant resins, lithium silicate, sodium silicate, potassium silicate or other refractory adhesives or any other method.

For weld backing rings built in accordance with the disclosure, the internal surface of the ring of tubular metal section insulating, high temperature resistant material may be structurally anchored to the external surface of the first metal cylinder by various bonding means, such as of high-strength adhesives, high temperature resistant resins, lithium silicate, sodium silicate, potassium silicate or other refractory adhesives or any other method.

The insulation layer tubular metal section insulating, high temperature resistant material may be structurally anchored or otherwise connected to one or more of the first metal cylinder and the second metal cylinder prior to mechanically or metallurgically connecting the first metal cylinder to the second metal cylinder.

The insulation layer (tubular metal section insulating, high temperature resistant material) may be applied to the external surface of the first metal cylinder or to the internal surface of the second metal cylinder by spraying, brushing, coating, or the like to a suitable thickness. Preferably, an aluminum oxide, Al2O3, coating is applied by a plasma spray process. Upon curing, drying or other finishing, the tubular metal section insulating, high temperature resistant material is anchored or otherwise connected to one or more of the first metal cylinder and the second metal cylinder.

For weld backing rings built in accordance with the disclosure, the posterior face or the external surface of the second metal ring may be structurally anchored to the internal surface of the tubular section by means of spot welding, brazing, high-strength adhesives or any other method.

For weld backing rings built in accordance with the disclosure, the second metal cylinder may be mechanically or metallurgically integrated or connected to the first metal cylinder by means of a) a raised or outwardly extending portion of the first metal cylinder welded or brazed to the second metal cylinder; b) a raised or inwardly extending portion of the second metal cylinder welded or brazed to the first metal cylinder; c) a spacer ring welded to the first metal ring and to the second metal ring, d) by means of a fold in the first metal cylinder welded to the second metal cylinder, e) by means of a fold in the second metal cylinder welded to the first metal cylinder, f) a plurality of spacer pins or tabs welded or brazed to the first metal cylinder and to the second metal cylinder; g) a fold or closed hem in the first metal cylinder welded to the second metal cylinder; h) a fold or closed hem in the second metal cylinder welded to the first metal ring; i) a fold or closed hem in the first metal cylinder welded to a fold or closed hem in the second metal cylinder; or j) by the construction of the first and second metal cylinders from the same metal plate folded in two or by any other constructive method. The posterior face or the external surface of the second metal cylinder may be structurally anchored to the internal surface of the tubular metal section through spot welding, brazing, high-strength adhesives or any other method.

The weld backing rings built in accordance with the disclosure may be coaxially and adjustingly inserted into each one of the abutting ends of the tubular sections to be butt welded so that the anterior faces of said weld backing rings protrudes from the plane of the face of the weld bevel by a distance equivalent to half of the specified root for the welding process adopted for said tubular sections, or the distance required to establish the specified root gap for the welding process adopted for said tubular metal sections. The protrusion distances from the plane of the face of the weld bevel of the tubular metal section may be different for two individual adjacent weld backing rings. For example, distances of protrusion of individual adjacent weld backing rings can be varied as long as the specified root gap is accounted for. One insulating weld backing ring can extend or protrude a distance equivalent 60% of a specified root gap and the adjacent second weld backing ring can extend a distance of 40% of the specified root gap. The protrusion distances may be zero, in case the specified root gap for the adopted weld process is zero, or even negative, the anterior faces of the weld backing rings recessed from the face of the weld bevels, in case the weld bevels are to be reconfigured or re-cut after the insertion of the weld backing rings.

The weld backing rings built in accordance with the disclosure have the internal surface and the posterior face of the first metal cylinder prepared or adapted to receive the ring liner (layer of lining material) which may be separately applied, before the installation of the insulating weld backing rings into the ends of the tubular sections, or may be applied together with the application of the pipe liner of said tubular sections. In this latter case, the weld backing rings, devoid of internal lining, may be positioned into the ends of each one of the tubular sections, also devoid of internal lining, and the pipe and ring liner (layer of internal lining) material may be applied, lining simultaneously both the exposed internal surface of tubular sections, and the exposed internal surface and posterior face of the first metal cylinder of the weld backing rings. The application of the internal lining material to the tubular sections may be performed according to any of the processes usually employed in the industry.

In the case the weld backing rings, built in accordance with the disclosure, are installed in tubular sections which are already internally lined or provided with a pipe liner (a layer of internal lining material), said weld backing rings, previously provided with the respective internal ring liners (layers of lining material), may be positioned into the ends of each tubular section, after a corresponding strip of the pipe liner (layer of liner material) of the tubular section has been removed. The removed strip or layer may be a width corresponding to the width of the weld backing rings. The ring liner (layer of liner material) of the first metal cylinder is provided in its posterior face, with a flanged portion, which is configured to confine, on one side, to the posterior face of the first metal cylinder and, on the other side, to the exposed anterior face of the pipe liner (layer of internal lining) of the tubular sections. A layer of suitable adhesive/sealant may be applied to the faces of both the pipe and ring liners, in order to ensure the integrity and continuity of the internal lining from end to the other of said tubular sections.

It is equally possible the installation into the ends of the tubular sections not yet internally lined, of weld backing rings built in accordance with the disclosure, to which the ring liner (layer of internal lining material) had already been applied. In this case, the weld backing rings may be positioned into the ends of each tubular section, and the pipe liner (layer of internal lining material) may be applied covering exclusively the exposed internal surface of the tubular section. The application of the pipe liner to the tubular sections may be performed according to any of the processes usually employed in the industry.

The plane of the anterior face of the ring liner (layer of lining material) of the internal surface of the first metal cylinder may be essentially contained within the plane of the anterior face of the weld backing ring. The anterior face of the ring liner (layer of lining material) of the internal surface of the first metal cylinder may be configured for sealing the interface with the corresponding ring liner (layer of internal lining material) of the internal surface of a second weld backing ring, when the ends of the abutting tubular sections are coaxially aligned and brought together one against the other for welding. The sealing means employed may comprise one or more of a) a sealing lip executed on the anterior face of the layer of internal lining material that covers the internal surface of the first metal cylinder, b) the application of a bonding material (e.g., a layer of suitable adhesive/sealant), and c) the execution of a seat designed to receive additional sealing elements, like a flat gasket, an O-ring or any other sealing means.

The weld backing rings may be fabricated as circular open rings, with an external perimeter equal to the maximum permissible internal perimeter of the ends of the standard tubular sections, according to the dimensional tolerances of diameter, out of roundness and wall thickness specified in the manufacturing standards of said tubular sections. This allows the adjustment of the weld backing rings to the effective internal dimensions of the ends of the tubular sections by means of a simple cutting operation for reducing the perimeter followed by closing the weld backing rings by the junction of the cut faces of the metal cylinders and by applying suitable bonding materials (e.g., adhesive/sealant) to the cut faces of the insulation layers (layers of tubular metal section insulating material and internal lining material), in the case the latter had been previously applied, not being required the preparation of tools, dies and molds specifically designed to meet the dimensional variations caused by the manufacturing tolerances.

The weld backing rings built in accordance with the disclosure reflect, insulate, spread and dissipate the heat generated during the execution of the butt weld of the tubular sections, protecting the layer of heat-sensitive internal liner material from the high temperatures resulting from the welding operation. In addition, they provide support and containment to the weld puddle of molten metal in such a way to ease full penetration of the welded joint, as defined by the engineering codes that govern the construction of piping systems and pipelines.

Yet another aspect of the present disclosure relates to a system for fabricating butt welded joints of tubular sections with standard ends provided with an internal lining of heat-sensitive materials employing the weld backing rings built in accordance with the aspects of the disclosure.

Two tubular sections, in the abutting ends of which have been coaxially and adjustingly inserted weld backing rings, built in accordance with the disclosure, may be brought together with the use of a commercially available alignment device, similar to the tool described in U.S. Pat. No. 5,052,608, the entire contents of which is hereby incorporated by reference herein. This tool (device) coaxially aligns two adjacent tubular sections and simultaneously reforms the ends of each one of said tubular sections into a circular geometry congruent to the other one, eliminating points of local misalignment. Even more important for the system for manufacturing butt welded joints of tubular sections of the disclosure is that this tool has the ability to bring together the abutting ends of the two tubular sections one against the other, so that each of the layers of the weld backing ring inserted into one end of one tubular section adjusts evenly and without voids to its counterpart layer of the weld backing ring inserted into the end of the other tubular section. In this way, the sealing means provided to the abutting faces of the ring liners (layers of internal lining material) of each of the weld backing rings can be properly compressed to seal the interface between these pipe liners (layers of internal lining material). Each one of the weld backing rings is coaxially and adjustingly inserted into the ends of the respective tubular section so that its anterior face protrudes the same distance from the plane of the face of the weld bevel and the contact between the two abutting anterior faces of said rings establish the specified gap for the welding process adopted.

The welding of the abutting ends of the tubular sections may be accomplished by any of the welding processes ordinarily employed for the construction of piping systems and pipelines not provided with internal lining of heat sensitive material, although low heat input processes are preferred. In addition, the welding procedure may incorporate the technique outlined in U.S. Pat. No. 3,508,766, the disclosure of which is incorporated herein by reference, to minimize heat buildup and to release the gases heated by the high temperatures resulting from welding, preventing damage to the sealing means employed. The first passes of the girth weld of the abutting ends of the tubular sections should leave a ventilation gap from the root of the weld up, to allow for the escape of these gases. Later, after the region of the joint cools off, the girth weld will be completed, closing the ventilation gap to produce a watertight (or fluid tight) and corrosion resistant joint.

In another aspect, the disclosure relates to a weld backing ring intended to be inserted into each one of the abutting ends of a first tubular metal section and of a second tubular metal section to be butt welded. The weld backing ring comprises a first metal cylinder and an insulation layer of tubular metal section insulating, high temperature resistant material. The insulation layer may be formed by the tubular metal section insulating, high temperature resistant material being laid out on the external surface of the first metal cylinder; and the plane of the anterior face of the insulation layer of tubular metal section insulating, high temperature resistant material to be essentially contained within the plane of the anterior face of the first metal cylinder.

The first metal cylinder may be constructed using expanded or perforated sheet metal. The weld backing ring may also comprise a second metal cylinder. The second metal cylinder may be laid out on the external surface of the insulation layer of tubular metal section insulating, high temperature resistant material. The plane of the anterior face of the second metal cylinder may be essentially contained within the plane of the anterior face of the first metal ring.

The second metal cylinder may be laid out on the external surface of the insulation layer of tubular metal section insulating, high temperature resistant material. The plane of the anterior face of the second metal ring may be essentially contained within the plane of the anterior face of the first metal ring. The second metal cylinder may be mechanically or metallurgically integrated to the first metal cylinder. The first metal cylinder may have the internal surface and the posterior face of the first metal cylinder provided with a layer of ring liner (lining material) which has a resistance to corrosive and erosive processes as well as to high temperatures, greater or equal to that of the pipe liner (layer of internal liner material of the tubular section) in which the weld backing ring will be inserted. The plane of the anterior face of the ring liner (internal lining material) may be essentially contained within the plane of the anterior face of the first metal cylinder. The anterior face of the ring liner (layer of internal lining material) may be configured for sealing the interface with the corresponding ring liner (layer of internal lining material) of a second weld backing ring, when the ends of abutting tubular metal sections are coaxially aligned and brought together against each other for welding.

The anterior face of the ring liner (layer of internal lining material) may be provided with a seat for the installation of additional sealing elements for sealing the interface with the corresponding layer of internal lining material of a second weld backing ring, when the ends of abutting tubular metal sections are coaxially aligned and brought together against each other for welding.

An aspect of the disclosure may relate to a system for fabricating butt-welded joints of tubular sections internally lined with liners or other heat-sensitive materials, employed in the construction of piping systems and pipelines by means of the butt-welding of individual tubular metal sections. The joints comprise a first tubular section and a second tubular section. The first and second tubular sections are provided with a pipe liner (layer of lining material) covering substantially all the internal surface of said tubular sections.

The weld backing ring may be coaxially and adjustingly inserted into each one of the abutting ends of the first and second tubular sections so that the anterior faces of the weld backing rings protrude from the face of the weld bevel of the tubular section by a distance equivalent to half of the specified root gap for the welding process adopted; and (iv) the abutting ends of the first tubular metal section and the second tubular metal section, being coaxially aligned and brought together one against the other for the execution of the welding.

In another aspect the disclosure relates to a system for fabricating butt-welded joints of tubular metal sections internally lined with heat-sensitive materials, employed in the construction of piping systems and pipelines by means of the butt-welding of individual tubular sections. The system comprises a first tubular section and a second tubular section. The first and second tubular sections are provided with a pipe liner (layer of lining material) covering substantially all the internal surface of said tubular sections.

The weld backing ring may be coaxially and adjustingly inserted into each one of the abutting ends of the first and second tubular sections so that the anterior faces of the weld backing rings protrude from the face of the weld bevel of the tubular metal section by a distance equivalent to half of the specified root gap for the welding process adopted. At least one additional sealing element may be installed in one of the seats provided on the anterior faces of the ring liners (layers of internal lining material) for sealing the interface with the corresponding layer of internal lining material of a second weld backing ring, when the abutting ends of the tubular metal sections have been coaxially aligned and brought together against each other for welding. The abutting ends of the first tubular section and the second tubular section, may be coaxially aligned and brought together one against the other for the execution of the welding.

In yet another aspect, the disclosure relates to a pre-assembled insulated weld backing ring for a pipe section of a pipeline. The pipeline has a passage therethrough for transporting fluids between locations. The pipe section comprises a tubular member having a tubular section at each end, the tubular section weldably connectable to the tubular section an adjacent pipe section. The weld backing ring comprises a first metal cylinder and an insulation layer. The first metal cylinder has a tubular body positionable in the tubular section and coaxially secured therein. The first metal cylinder has a stepped external surface defining a ring shaped anterior portion and a ring shaped raised posterior portion with a step therebetween. The anterior portion has an anterior face positioned about the end of the tubular section for abutting engagement with the corresponding anterior face of the first metal cylinder of an adjacent tubular member of the pipeline. The posterior portion has a larger diameter than the anterior portion to define an insulation (tubular metal section) pocket between an external surface of the anterior portion and an internal surface of the tubular section when positioned in the tubular section, the insulation pocket having an open end about an anterior face of the tubular section and a terminal end adjacent the step. An external surface of the raised posterior portion is positioned in one of engagement and non-engagement with the internal surface of the tubular section when the first metal cylinder is secured in the tubular section.

The insulation layer is positioned on the external surface of the metal cylinder for insertion into the tubular section with the first metal cylinder, and has a posterior end positioned against the step of the first metal cylinder and an anterior end positioned about the end of the tubular section for abutting engagement with the corresponding anterior end of the insulation layer of the adjacent tubular member. The insulation layer comprises a tubular metal section insulating material positioned in the insulation pocket to define a protective barrier between the first metal cylinder and the tubular member when installed in the tubular section whereby the tubular member is protected from heat during welding of the tubular member to the adjacent tubular member.

The weld backing ring further comprising a ring liner disposed over the internal surface of the metal cylinder. The ring liner comprises a corrosively resistant material.

The ring liner has a seat along an anterior end thereof, and the weld backing ring further comprising a sealing element positioned in the seat of the liner to sealingly engage the sealing element of the adjacent tubular member.

The first metal cylinder has a surface with an anchoring pattern to grippingly engage the ring liner. The weld backing ring further comprises a second metal cylinder positioned between the insulation layer and the tubular member. The second metal cylinder is positioned along an external surface of the posterior portion of the first metal cylinder and the external surface of the insulation layer. A posterior end of the first metal cylinder and a posterior end of the second metal cylinder are integral. The integral posterior end of the first metal cylinder and the posterior end of the second metal cylinder has perforations therethrough. An external surface of the posterior portion of the first metal cylinder and the external surface of the insulation layer are positionable along the internal surface of the tubular section. The tubular metal section insulating material comprises a temperature resistant material with a tubular metal section conductivity between 0.1 and 1.6 W/(m° K) @ 650° C. and melting point between 900° C. and 1,800° C. The tubular metal section insulated material comprises at least one of ceramic fiber, fiberglass, rock wool, ceramic fiber tape, ceramic fiber paper, silica tape, high temperature resistant resins, lithium silicate, sodium silicate, and potassium silicate refractory binders.

The weld backing ring further comprises spacers positioned about a posterior face of the first metal cylinder, and a bonding material between at least two of: the first metal cylinder, the insulation layer, a liner sealing element, a second metal cylinder, and the tubular section.

In another aspect, the disclosure relates to a pipe section of a pipeline. The pipeline has a passage therethrough for transporting fluids between locations. The pipe section comprises a tubular member having a tubular section at each end, a first metal cylinder, and an insulation layer. The tubular section is weldably connectable to the tubular section an adjacent pipe section. The first metal cylinder has a tubular body positionable in the tubular section and coaxially secured therein, and a stepped external surface defining a ring shaped anterior portion and a ring shaped raised posterior portion with a step therebetween. The anterior portion has an anterior face positioned about the end of the tubular section for abutting engagement with the corresponding anterior face of the first metal cylinder of an adjacent tubular member of the pipeline. The posterior portion has a larger diameter than the anterior portion to define an insulation pocket between an external surface of the anterior portion and an internal surface of the tubular section when positioned in the tubular section. The insulation pocket has an open end about an anterior face of the tubular section and a terminal end adjacent the step. An external surface of the raised posterior portion positioned in one of engagement and non-engagement with the internal surface of the tubular section when the first metal cylinder is secured in the tubular section. The insulation layer is positioned on the external surface of the metal cylinder for insertion into the tubular section with the first metal cylinder, and has a posterior end positioned against the step of the first metal cylinder, the insulation layer having an anterior end positioned about the end of the tubular section for abutting engagement with the corresponding anterior end of the insulation layer of the adjacent tubular member. The insulation layer comprises a tubular metal section insulating material positioned in the insulation pocket to define a protective barrier between the first metal cylinder and the tubular member when installed in the tubular section whereby the tubular member is protected from heat during welding of the tubular member to the adjacent tubular member.

The pipe section has a constant inner and outer diameter, with a bevel at each end of the pipe section. The insulation layer is present in one of at least 50%, 80%, 95%, and 100% of an axial length of the anterior portion of the first metal cylinder. The first metal cylinder has a first thickness at the posterior end, wherein the first metal cylinder and the insulation layer have a second thickness at an anterior end, the first thickness is greater than the second thickness. The second thickness is from about 30% to 100% of the first thickness. The first metal cylinder has an axial length, the first thickness extends along a first portion of the axial length and the second thickness extend along a second portion of the axial length, the second portion occupying a greater portion of the axial than the first portion.

The pipe section further comprises a second metal cylinder positioned between the insulation layer and the internal surface of the tubular section and wherein the second metal cylinder has an anterior end portion substantially flush with the anterior end portion of the first metal cylinder. The anterior end of the first metal cylinder and the anterior end of the insulation layer extend past the end of the tubular section.

Finally, in another aspect, the disclosure relates to a method of welding adjacent pipe sections of a pipeline. The pipeline is for transporting fluids between locations. The method comprises pre-assembling a weld backing ring by: providing a sheet of metal; applying an insulation layer (material) onto an external surface of the sheet of metal; and rolling the sheet of metal into a first metal cylinder. The method continues with insulating a tubular section of each of the adjacent pipe section from welding heat by: inserting the pre-assembled weld backing ring into an end of the tubular sections of each of the adjacent pipes; positioning an anterior end of each of the first metal cylinders flush with the end of the tubular sections of each of the adjacent pipes; and securing the pre-assembled weld backing rings to an internal surface of the tubular section of each of the adjacent pipes. The method continues with positioning the ends of each of the adjacent pipes together with the anterior ends of the pre-assembled weld backing ring of each of the adjacent pipes in contact; and forming a weld between the adjacent pipe section by applying the welding heat to each of the adjacent pipes sections.

The pre-assembly further comprises applying a second sheet of metal onto the insulation layer (tubular metal section insulating material) on the external surface of the insulation layer to form a second metal cylinder and where the securing comprises bonding the second metal cylinder to the internal surface of the tubular section. The pre-assembly further comprises integrating a posterior end of the first metal cylinder with a posterior end of the second metal cylinder.

The pre-assembly further comprises folding over a posterior portion of the sheet of metal onto the external surface of the sheet of metal, wherein the rolling the sheet of metal into the first metal cylinder further comprises rolling the folded posterior portion into a raised ring along the external surface of the first metal cylinder, and wherein the securing the pre-assembled weld backing ring comprises bonding the raised ring to the internal surface of the tubular section. The pre-assembly further comprises folding over a posterior portion of the sheet of metal onto the external surface of the sheet of metal, wherein the rolling the sheet of metal into the first metal cylinder further comprises rolling the folded posterior portion into a second metal cylinder, and wherein the securing the pre-assembled weld backing ring comprises bonding the second metal cylinder to the internal surface of the tubular section.

The securing comprises bonding together at least two of: the first metal cylinder, the insulation layer, a liner sealing element, a second metal cylinder, and the tubular section. The applying and rolling are performed simultaneously or at different times.

This Summary is not intended to be limiting and should be read in light of the entire disclosure including text, claims and figures herein.

BRIEF DESCRIPTION OF THE DRAWINGS

So that the above recited features and advantages of the present disclosure can be understood in detail, a more particular description of the disclosure, briefly summarized above, may be had by reference to the embodiments thereof that are illustrated in the appended drawings. The appended drawings illustrate example embodiments and are, therefore, not to be considered limiting of its scope. The figures are not necessarily to scale and certain features, and certain views of the figures may be shown exaggerated in scale or in schematic in the interest of clarity and conciseness.

FIGS. 11A and 11B show perspective and cross-sectional views, respectively, of the weld backing ring of FIGS. 7A and 7B with integrated metal cylinders.

FIGS. 12A and 12B show perspective and cross-sectional views, respectively, of the weld backing ring of FIGS. 7A and 7B with slotted integrated metal cylinders.

FIGS. 13A and 13B show perspective and cross-sectional views, respectively, of the dual weld backing ring of FIGS. 7A and 7B with a flat first metal cylinder.

FIG. 14 is a flow chart depicting a method of welding adjacent pairs of the pipe sections with the insulated weld backing ring.

DETAILED DESCRIPTION

Figure 1:
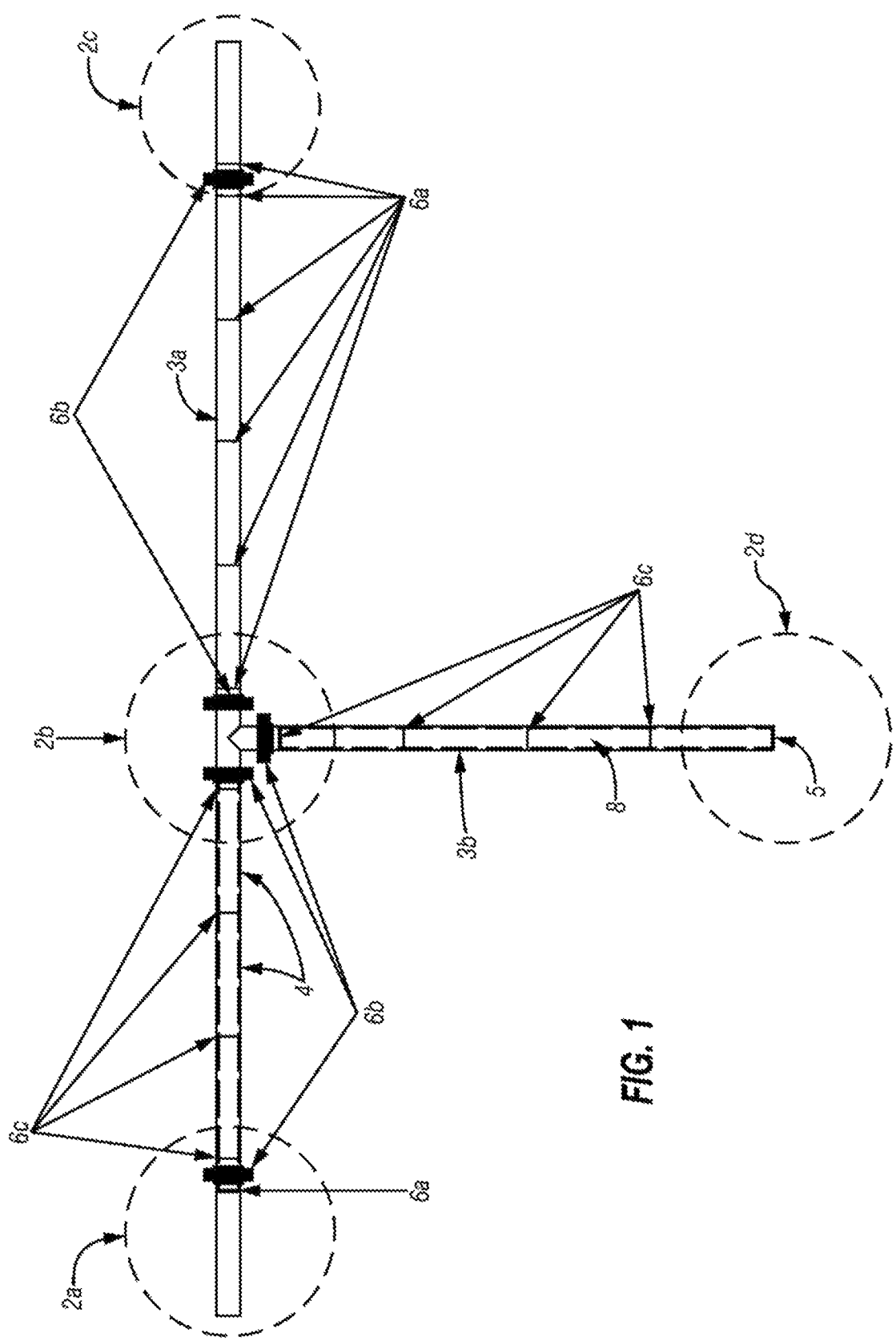
FIG. 1 is a schematic diagram depicting a pipeline comprising pipe sections (tubular members) connected together by various joints, including an insulated butt weld joint.

The description that follows includes exemplary apparatus, methods, techniques, and/or instruction sequences that embody techniques of the present subject matter. However, it is understood that the described embodiments may be practiced without these specific details.

The present disclosure relates to a weld backing system for joining pipe sections of a pipeline. The weld backing system includes a weld backing ring designed to be inserted into each one of abutting ends of adjacent pipe sections (tubular metal sections) for forming a welded connection (joint) therebetween. The weld backing ring is an insulated weld backing ring for fabricating butt-welded joints in tubular sections along ends of the adjacent pipe sections. The pipe sections may be internally lined with heat-sensitive materials which could be locally degraded, damaged, or destroyed by high temperatures generated during a welding process.

The backing ring includes a first metal cylinder (first metal right circular hollow cylinder) and an insulation layer (right circular hollow cylinder). The insulation layer is made of a tubular metal section insulating, high temperature resistant material, disposed on the external surface of the first metal cylinder. The internal surface and the posterior face of the first metal cylinder may be prepared to receive a pipe and/or ring liner (layer of lining material), which is resistant to corrosive and/or erosive materials and/or processes. The pipe sections may be internally lined with heat-sensitive materials using two insulating weld backing rings, inserted on each of the abutting ends of the tubular sections of the pipe sections to be welded.

The weld backing ring and/or system may be configured such that it: (i) does not require modification of the geometry of the ends of the standard tubular sections to be welded; (ii) may effectively and consistently produce certified, high quality, full penetration butt welded joints, supported by the engineering standards that govern the construction of pipelines and piping systems, protecting the internal liner material from damage, degradation or disbonding caused by the high temperatures generated in the welding operations; (iii) makes use of equipment, techniques and inspection procedures usually employed in the construction of ordinary pipelines and piping systems to perform constructive steps that precede and succeed the welding of field joints; and/or (iv) employs basically the same or similar welding processes as in the construction of existing pipelines and piping systems, such as those built from tubular sections that do not have an internal liner of heat-sensitive materials.

The weld backing system and/or ring also seeks to provide one or more of the following capabilities, among others: ease of manufacture, ease of assembly, efficient operation, secure joints, cost effective assembly and/or use, reinforced strength, operability with existing systems and/or equipment, usable without damage to the pipes, liners, and/or portions thereof. The weld backing system and/or ring also intends to meet safety standards; maintain a sealed connection between pipe sections; have high load capabilities, provide execution of butt welds of tubular sections internally lined with heat-sensitive materials without the need to expand, machine or modify in any way the geometry of the ends of the sections; provide effective and consistent production of full penetration, certified, high-quality butt welded joints, covered by the engineering standards and codes that govern the construction of pipelines and piping systems; protect the heat-sensitive internal lining material from damage, deterioration or disbonding caused by the high temperatures generated in the welding operations; use equipment, techniques and inspection procedures usually adopted in the construction of pipelines and piping systems to perform the welding of field joints; reduce cost of industrial projects involving the construction of pipelines and piping systems internally lined with heat-sensitive materials (this reduction may be greater in the case of large diameter of pipelines and piping systems designed to operate at high pressures); provide preassembly of weld backing rings which may be installed in fixed shops, before the internal lining is applied, in straight or curved tubular metal sections, fittings, and accessories; easy installation of weld backing rings at the field in internally lined tubular sections; operability in various configurations, such as straight or curved, full length or cut to size, after removing the corresponding strip of the internal lining of said sections; use base materials for the tubular metal section insulating, high temperature resistant material, and the materials of internal lining of the insulating weld backing rings designed and tailored to meet the specific features of each project that involve the construction of pipeline and piping systems from individual tubular sections internally lined with heat sensitive materials, etc.

Pipeline System

Next, the present invention will be described in connection with examples of preferred embodiments represented in the annexed drawings.

FIG. 1 is a schematic diagram depicting an example pipeline system 1 in which the disclosed weld backing system and/or weld backing ring may be employed. The pipeline system 1 includes facilities 2a-2d with pipelines 3a,3b extending therebetween. In the example shown, the facilities include a production facility 2a, a beneficiation facility 2b, a market 2c, and a tailings disposal 2d. The pipelines 3a extend from the production facility 2a, through the beneficiation facility 2b, and to the market 2c. The pipeline 3b branches off of pipeline 3a at the beneficiation facility 2b and extends to the tailings disposal 2d.

The pipelines 3a,b include a series of pipe sections (tubular members) 4 connected together end to end to form the pipeline. A passage 5 extends through each of the pipe sections 4 to define a pathway for the passage of fluids (e.g., oil, gas, water, etc.) between the facilities 2a-d. In some cases, a liner may be present in the pipelines 3a,3b as indicated by the hidden line.

Each of the pipe section 4 in the pipelines 3a,3b is connected by a joint 6a-c. Depending on the need, one or more types of joints may be used in the pipelines 3a,b. In the example shown, the pipe sections 4 are connected by a conventional weld joint 6a, a conventional mechanical (or flange) joint 6b, and insulated butt weld joints 6c. It will be appreciated that different configurations of pipelines, pipes, and joints can be used.

The butt weld system may be used with a continuous, monolithic piping system or pipeline of individual pipe sections. The pipe sections may be connected end to end in series by the various joints 6a-6c. The type of joint used to join pipe sections may be selected based on the needs of the connection, the pipes, and/or the pipeline. The welded joints 6a and 6c may be capable of resisting to the same longitudinal, shear, or hoop stresses as the base metal of the original tubular section of the pipes. The mechanical joints 6b may be used with certain metals and/or configurations. In at least some cases, mechanical joints may have disadvantages, as compared with butt welded joints. For example, mechanical joints may be prone to leakage in some pipelines. Except for flanged connections, mechanical joints may present limited pressure resistance and may require anchoring at changes in direction of piping systems or pipelines, due to poor resistance to longitudinal stresses. Flanged connections, may be very expensive, especially with higher pressures and larger pipe section diameters. Flanged connections may also require execution of a weld at each end of each tubular section, twice the number of butt welded joints required to build a welded piping system or pipeline. In another example, when there are changes in direction involving out of plane bends, or reverse bends in piping systems or pipelines with flanged joints, expensive lap flanges and stub ends may be mandatory, to allow the alignment of the bolt holes of the mating flange faces. Insulated butt-welded joints are intended to be usable in a variety of applications to provide a low-cost alternative capable of performing in all applications as is described further herein.

Examples of conventional joints that may be used in parts of the pipeline are provided. An example of existing systems in the art is that proposed by Kessler, in U.S. Pat. No. 3,508,766, of Apr. 28, 1970, which discloses a welded joint between belled ends of tubular members having internal surfaces coated—with corrosion resistant material which is subject to damage by excessive heat. Joint includes internally coated sleeve disposed coaxially within belled ends and having heat retardant means thereabout to retard the flow of heat from the region of the weld. Ends of sleeve are sealed to inner surface of tubular members by a thermosetting or thermoplastic sealant applied while in the plastic state, and formed into seals during assembly of the joint by packer means on the sleeve. To prevent welding gasses from blowing through the packer means and the uncured sealant, an incomplete girth weld is made about the ends of the tubular members, thereby forming a vent to permit the escape of welding gasses. Subsequently, the vent is welded closed to provide a fluid tight corrosion resistant joint.

In some cases, the joint may have issues: (i) require the ends of the tubular sections to be previously expanded to form pockets, in an additional operation that may increase the cost of its manufacture; (ii) the tubular insert is coaxially introduced halfway into the pocket formed at the end of a first tubular section and may have the other half also coaxially introduced into the pocket formed at the end of a second tubular section, which may require the longitudinal displacement of the latter, along the axis of both tubular sections, at least by a distance equal to half the length of the tubular insert so that the abutting ends of the two tubular sections are positioned for welding. This operation may be of very difficult execution, especially in the tie-in welds of relatively long strings, formed from large-diameter tubular sections, often performed after these strings already have been lowered in a ditch; (iii) the internal lining of the tubular sections may cover the internal surface of the pockets formed in their ends up to the face that may be welded, being locally subject to the effects of the high temperatures generated in welding operation. The possible degradation of the internal lining during welding may contaminate the weld root and may produce undesirable porosity, among other defects that may detract from the strength and quality of the welded joint; (iv) may not allow verification of the integrity of the layer of thermoplastic or thermosetting plastic sealant, that is applied to the tapered ends of the tubular insert before introducing the tubular insert into of the pockets formed at the end of the tubular sections; (v) the sealant may flow off to the interior of the tubular sections before curing, leaving the annular regions between the tapered ends of the tubular insert and the internal surface of the pockets without the desired seal, which leads to the possibility of internal corrosion of the welded joints.

The joint may also be between belled ends of tubular members having internal surfaces coated with corrosion resistant material which may be subject to damage by excessive heat. The joint may include internally coated sleeves disposed coaxially within belled ends and having heat retardant means thereabout to retard the flow of heat from the region of the weld. Ends of sleeve may be sealed to inner surface of tubular members by a thermosetting or thermoplastic sealant applied while in the plastic state, and formed into seals during assembly of the joint by packer means on the sleeve. To prevent welding gases from blowing through the packer means and the uncured sealant, an incomplete girth weld may be made about the ends of the tubular members, thereby forming a vent to permit the escape of welding gases. Subsequently, the vent may be welded closed to reportedly provide a fluid-tight corrosion resistant joint.

Another system is taught by Galfant, in U.S. Pat. No. 5,104,152, of 14 Apr. 1992, which also discloses a welded pipe joint for pipes which are internally lined for carrying corrosive fluids is formed by an internally lined insert extending into the belled end sections of the pipes to be joined and engaging the belled end sections with a mechanical interference fit, The insert, which is provided with a heat shield to retard the transfer of heat during a subsequent welding operation, is held in coaxial alignment with the pipes while the adjacent ends of the pipes are brought together. The adjacent ends of the pipes are finally welded to complete the joint.

In some cases, the assembly of the tubular insert with mechanical interference into the pockets formed at the ends of the tubular sections may imply considerable effort and requires each of the welded joints to be performed with the use of an assembly press powered by hydraulic pistons, in an operation that may be impractical when executed in the field, except for piping systems and pipelines of very small diameter.

U.S. Pat. No. 3,890,483 to Webster relates to a method of joining a first metallic pipe section having a coating of a heat-degradable material on one surface thereof, to a second metallic pipe section along abutting edges by forming a welded joint between the abutting metal edges of the metallic pipe sections. Before forming the welded joint there is inserted between the metallic pipe section and the coating along the edge thereof which is to be welded to the second pipe section a quantity of material which may prevent heat being transferred from the welded joint during the formation thereof to the coating.

U.S. Pat. No. 3,965,555 to Webster relates to a method of joining a first metallic structural member, which comprises a metallic member having a coating of a heat-degradable material on one surface thereof, to a second metallic structural member which comprises a metallic member, along abutting edges by forming a welded joint between the abutting metal edges of the metallic members in which method the metallic member and the coating of the first structural member are separated along that edge of the first structural member which is to be welded to the second structural member by a heat shield which substantially prevents heat being transferred from the welded joint, during the formation thereof, to the coating.

The weld system may allow for the alignment and the junction of tubular sections by transverse displacement of one of the tubular sections in relation to the other, without requiring a significant longitudinal displacement. The need may remain to expand the ends of the tubular sections to accommodate the heat shield and the insulation layer inserted between the heat shield and the divergent walls of the end of each tubular section. This may increase the cost of manufacturing of tubular sections and/or may require the use of special equipment for the execution of the construction operations of piping systems and pipelines.

U.S. Publication 2004/0070199 to Trivelli relates to a welded joint for metal pipe sections provided with an inner lining, which may be resistant to damage caused by the fluids flowing through them. The pipe sections may be machined in the inside at the areas next to the ends to be joined, forming an undercut at each end. A spacer ring is inserted in the hollow annular space formed by both undercuts. The outer diameter of this spacer ring may be substantially equal to the diameter of the corresponding undercuts, and its axial length may be substantially equal or less than the sum of the axial lengths of the undercuts of the pipe sections to be joined. The spacer ring may be made of an outer annular layer of a tubular metal thermally conductive metal and at least one inner annular layer of heat-insulating and heat resistant material. The outer annular layer may abut in heat conducting contact with the metal pipe sections within said undercuts, and the metal pipe sections are joined by a weld seam.

In some cases (i) the machining of the inside of the pipe sections at the areas next to the ends to be joined forming an undercut at each end may be requires, an additional operation that may increase the cost of its manufacture; (ii) the spacer ring may be coaxially introduced halfway into the hollow annular space formed by the undercut at the end of a first tubular metal section and may have the other half also coaxially introduced into the undercut formed at the end of a second tubular metal section, which may require the longitudinal displacement of the latter, along the axis of both tubular metal sections, at least by a distance equal to half the length of the spacer ring so that the abutting ends of the two tubular metal sections are positioned for welding. This may be of difficult execution, for example, in the tie-in welds of relatively long pipe section strings, formed from welding together large-diameter tubular metal sections, an operation which is often performed after these strings already have been lowered in a ditch.

Another development is disclosed by U.S. Publication 2013/092936 to Rosen that relates to a pipe section arrangement comprising two pipe sections and a sleeve, wherein both pipe sections have an outer metal wall and an inner, heat-sensitive lining of plastic and also end sides facing one another and are connected to one another via the sleeve which is arranged outside the pipe sections and which is welded to at least one pipe. Annular metal inserts provided with an internal layer of tubular metal section insulating material are introduced into the tubular metal sections to be joined by welding, at a short distance from their ends. The internal liner is then applied, to cover the internal surface of the tubular sections, including the annular inserts. One of the ends of the tubular sections may then be coaxially introduced up to half the length of an external metal sleeve, in such a way that a fillet weld is made between the external surface of the tubular section and the external metal sleeve, at the area where the internal liner is protected by the corresponding annular insert. For the assembly at the field, the end of a second tubular section is coaxially introduced into the second half of the same external metal sleeve until the face of its internal liner meets the face of the internal liner of the first tubular section and receives a fillet weld in a similar manner to the first one, also at the area where the internal liner is protected by the corresponding annular insert.

The system may involve replacement of the reliable, strong and easily non-destructively inspected butt welded joint by the execution of two fillet welds, which may be weaker and of much more difficult non-destructive inspection, and in a configuration, which may not be supported by the engineering codes and standards that govern the construction of piping systems and pipelines. It may also require a change in ordinary construction operations and procedures for piping systems and pipelines, to potentially produce a lower quality result. For assembly at the field, a second tubular section may be coaxially inserted into the sleeve placed at the end of the first tubular section, in an operation which may require its longitudinal displacement along the axis of both tubular sections, at least by a distance equal to half the length of the external metal sleeve. This operation may be of difficult execution, for example, in the case of tie-in welds of relatively long pipeline strings formed from large diameter tubular sections, which may be performed after these strings have been lowered into a ditch. The dimensional variation that may result from fabrication tolerances of tubular sections may render the proper adjustment of the tubular section and the external metal sleeve challenging. Field adjustments may also be needed that may require cutting of one or more tubular sections to certain lengths in order to adjust them to already installed pipelines. In this case, alternative procedures and resources may need to be sought to make the interposition of the metal annular inserts provided with a ring of tubular metal section insulating material, between the wall of the tubular section and the internal lining material.

Another development is the system taught by Raber in U.S. Pat. No. 9,599,257 B2, of Mar. 21, 2017, which discloses a joint ring, system for lined pipes includes a first pipe and a second pipe joined end-to-end, each pipe having an interior lining covering substantially all of an interior wall of the respective pipe. A first ring is disposed within and substantially flush with the joined end of the first pipe, and a second ring is disposed within and substantially flush with the joined end of the second pipe. The first ring is configured to create a first circumferential pressure seal against the interior wall of the first pipe, and the second ring is configured to create a second circumferential pressure seal against the interior wall of the second pipe. At least one of the first ring and the second ring is configured to create a pipe joint pressure seal against the other ring.

The system proposed by Raber may not require the expansion of the ends of the tubular sections, which may have industry standard dimensions. The total thickness of the rings and their internal lining may be the same as the thickness of the internal lining of the tubular sections in which they will be inserted. The rings are configured to receive sealing elements to seal against the internal wall of the tubular sections as well as to seal against each other.

In the assembly at the field, the abutting ends of the tubular sections to be joined by welding may be aligned and brought together against each other by a coupling device, receiving a butt weld executed by the processes usually employed in the construction and assembly of piping systems and pipelines. The alignment of the abutting tubular sections can be made by transverse displacement of one of said sections in relation to the other and does not require significant axial displacement.

As the decrease in temperature caused by the interposition of the highly heat-conductive metal rings between the weld root, which is the region of highest temperature during the welding, and the internal lining material, may be relatively small, given that the heat flow transmitted by conduction in the direction of the thickness of the metal rings finds no obstacle. Relatively thick metal rings internally lined with materials specially formulated to: (i) resist to the high temperatures generated in the welding process, which are transmitted by conduction across the metal rings and (ii) present a much greater resistance to erosion or corrosion than the base material of the internal lining of the tubular sections, in order to compensate for the reduced thickness of the internal lining applied to the metal rings, may be needed. Even considering that the puddle of molten weld metal goes through the full thickness of the wall of the tubular section, to make what is technically defined as a 'full penetration joint', this puddle of molten weld may not penetrate through the entire thickness of the rings, since even the specially formulated lining material may not resist to direct exposition to such high temperatures.

The metal rings may be conformed to a specified diameter and machined to a defined tolerance, before being placed in dedicated and costly precision injection molds to receive internal lining materials especially formulated to resist corrosion, erosion and high temperatures. Considering that the tubular sections employed in the construction and assembly of piping systems and pipelines may be produced with a relatively large range of tolerances for diameter and wall thickness, several sets of molds and tools that cover the possible dimensional variations may be needed to produce internally lined metal rings and may increase its cost of manufacture.

Examples of other pipeline techniques that may be used include: (i) replacement of the parent metal of a tubular section at a joint with a material able to resist erosion or corrosion; (ii) internal lining of the parent metal of the tubular section at the joint with a material able to resist erosion or corrosion; (iii) modification of both ends of the tubular sections forming pockets, intended, each one, to receive half of the length of a tubular insert, internally lined to ensure continuity of the internal liner of the assembly and configured to protect the internal liner at the weld area of the abutting pipe section ends; (iv) welding of the end of one of the tubular sections into an external metal sleeve by means of a fillet weld followed by welding of the next tubular section into the same external metal sleeve, also by means of a fillet weld; (v) insertion of metal rings into each one of the abutting ends of the tubular sections to be welded to function as heat shields during the welding, thus reducing the temperature at the interface with the heat-sensitive lining material; and (vi) additional operations to be performed after welding sections to restore the internal lining at the weld area, through pouring liquid lining material into the tubular sections.

While several examples of techniques that may be used are described, these are not intended to be limiting of the features of the disclosed insulated weld backing ring and/or joint (e.g., joints 6c) described further herein. These examples in this section describe features usable with the disclosed insulated weld backing rings, joints, and/or systems.

Insulating Weld Backing Ring

FIGS. 2A-13B show various views of a tubular section 7 of one of the pipe sections 4 provided with the insulated weld backing ring at an end thereof for forming the insulated butt weld joints 6c with an adjacent tubular section 7. FIGS. 2A-4B show various versions of weld backing rings 8a in a stepped configuration. FIGS. 5A-5B show an insulated butt weld joint 6c1 made with the insulated weld backing ring 8a. FIGS. 6A-8B show another weld backing ring 8b in a dual configuration. FIGS. 9A-9B show another insulated butt weld joint 6c2 made with the weld backing ring 8b. FIGS. 10A-13B show various versions of weld backing rings 8c-f with various features.

In each of the figures, the tubular sections 7 are a portion of a pipe section 4 with standard ends. The pipe section may be a conventional pipe section usable in the pipeline (e.g., 3a,3b of FIG. 1), and capable of receiving the weld backing ring 8a-8f therein. The pipe section 4 may be made of various materials, such as stainless steel, metal alloys, and/or other materials and combinations of materials. The pipe section may have a tubular body shaped for the passage of fluid therethrough, and with metal tubular sections 50 at each end. The tubular sections 50 may be shaped for receiving the insulated weld backing ring 8a-8f and mating with an adjacent pipe section (e.g., beveled) to form the insulated butt weld joint 6a1,6a2 therebetween. Examples of pipe sections that may be used are commercially available from MARUBENI-ITOCHU TUBULARS AMERICA™ at www.mitube.com/products.linepipe-2.

In an example, the tubular sections 50 to be welded may be industry standard carbon steel tubular sections, internally lined with a pipe liner 60 made of natural or synthetic rubber, polytetrafluorethylene (PTFE), polypropylene, high density polyethylene (HDPE) or polyurethane, although those of skill in the art may recognize uses for the system with other types of tubular sections and with other types of internal linings.

Figure 2A:
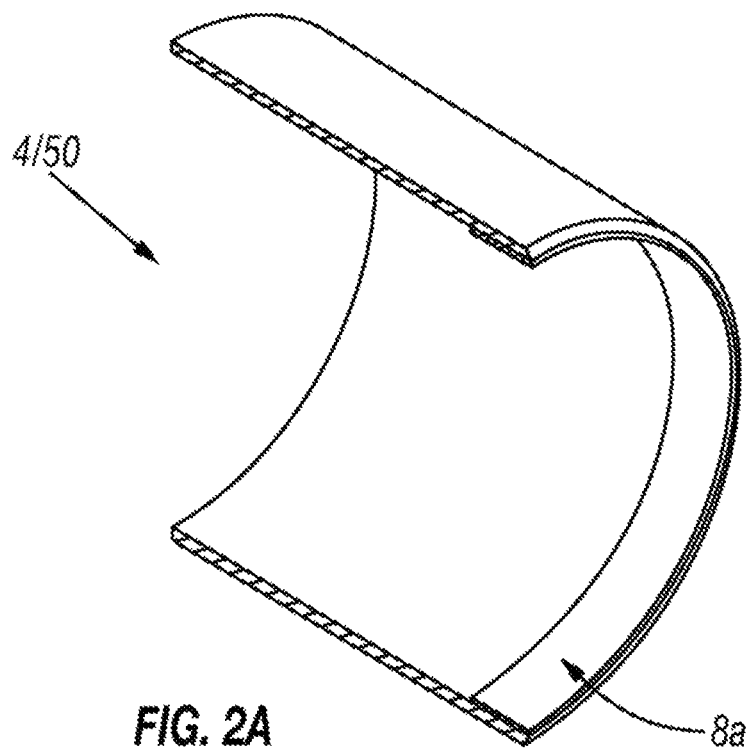
FIGS. 2A and 2B show longitudinal cross-sectional and detailed views, respectively, of a tubular section having a weld backing ring in a stepped configuration and without a liner.
Figure 2B:
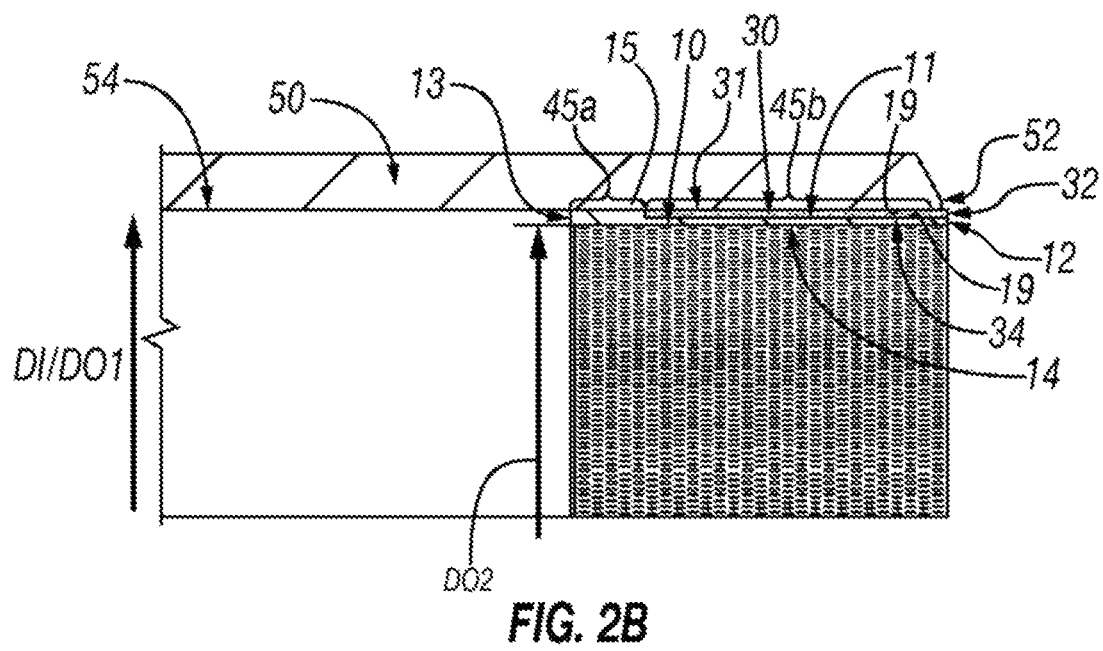

FIGS. 2A and 2B show the tubular section 50 provided with the insulated weld backing ring 8a in a single configuration for forming the insulated butt weld joint with an adjacent tubular section 50 of a similar configuration. The tubular section 50 in this example is devoid of a liner (layer of internal lining material). The weld backing ring 8a is inserted into one of the ends of a tubular section 50. Optionally, the weld backing ring 8a may be inserted into both ends of the pipe section (see, e.g., 4 of FIG. 1). The portion of the pipe section 4 with the weld backing ring 8a is a tubular metal section 50 with a constant inner and outer diameter, except for a bevel 52 along the end thereof.

The weld backing ring 8a includes a first metal cylinder 10 (first right metal circular hollow cylinder) and a tubular metal section layer (right circular hollow cylinder of tubular metal section insulating, high temperature resistant material). The weld backing ring 8a is inserted into the end of the tubular section 50. The first metal cylinder 10 is positioned adjacent to an end of the tubular section 50 and extends a distance therein. The weld cylinder 10 has an anterior face 12 adjacent to (flush with) the end of the tubular section 50, and is positioned for abutting contact with a corresponding anterior face 12 of the first metal cylinder 10 of an adjacent tubular section 50.

The first metal cylinder 10 is a tubular member with a constant inner diameter DI, and a stepped outer surface having a step 15 along an outer periphery of the first metal cylinder 10. The first metal cylinder 10 has a raised or outwardly extending flange (ring-shaped raised posterior) portion 45a about a posterior face 13 of the metal cylinder 10, and a pocket portion (ring-shaped anterior portion) 45b about the anterior face 12 of the metal cylinder 10. The step 15 separates the weld cylinder 10 into the ring-shaped flange portion 45a of a first diameter DO1 and a ring-shaped pocket portion 45b of a second diameter DO2. The first diameter DO1 is approximately equal to the inner diameter DI, and DO1 is greater than DO2.

The flange portion 45a is positioned adjacent to the internal surface 54 of the tubular section 50. The flange portion 45a of the posterior end of the metal cylinder may be structurally anchored to the internal surface of the tubular metal section 50 through spot welding, brazing, high-strength adhesives or any other method. When the flange portion 45a is anchored to the internal surface of the tubular section 50, the pocket portion 45b remains a distance from the internal surface of the tubular section 50 to define an insulation pocket 19. The insulation pocket 19 extends from the anterior face 3Z of the tubular section 50 and between the inner surface of the tubular section, 50, the outer surface of the metal cylinder 10, and the step 15. The insulation pocket 19 is shaped to receive the insulation layer 30. The flange portion (45a) of the metal cylinder (10) is shaped to contact the internal surface (54) of the tubular metal section (50) and to protect the insulation layer (30) upon insertion of the insulating weld backing ring 8a into the end of the tubular metal section (50).

The metal cylinder (10) can be formed from any suitable metal, such as any metal capable of being welded with the metal cylinder 10 of an adjacent tubular section 50. In an example, the first metal cylinder (10) may be formed or rolled from a metal sheet strip. The first metal cylinder (10) may comprise expanded and/or perforated metal in some embodiments. The weld cylinder 10 can be formed from any suitable metal, such as a material that is metallurgically similar to the material of the pipe section 4. The term "metal" herein can refer to a single metal as well as alloys or various metals containing various elements in desired proportions. Preferred metals include, but are not limited to carbon steels, stainless steels, alloy steels, nickel and its alloys, aluminum and titanium. The construction of the first metal cylinder 10 may employ, for example, an expanded and/or perforated metal plate, to provide a tridimensional anchor pattern for attachment of a liner (layer of internal liner material) as is described further herein.

The insulation layer 30 is a layer of material that, when applied to the first metal cylinder 10 forms a tubular or ring-shaped member. The insulation layer 30 is positionable between the weld cylinder 10 and an inner surface of the tubular section 50. The insulation layer 30 has an anterior face 32 adjacent to the anterior face 12 of the first metal cylinder, and extends a distance into the tubular section 50. The insulation layer 30 is positioned for abutting contact with the insulation layer 30 of the adjacent tubular section. The pocket 19 between the first metal cylinder 10 and the tubular section 50 is shaped to receive the insulation layer 30. The flange portion 45a may be essentially of the same thickness as the insulation layer 30, which contacts the interior surface of the tubular section 50. Once inserted into the pocket 19, the outer surface of the insulation layer 30 may have the same diameter DO1 as the flange portion 45a to provide a smooth surface for contact with the inner surface of the tubular section 50.

The insulation layer 30 may provide a barrier between a portion of the weld cylinder 10 and the tubular section 50. The insulation layer 30 may be made of a composite (or non-metal) material capable of withstanding heat, such as heat applied during welding, such as a tubular metal section insulating, high temperature resistant material built of ceramic fiber, fiberglass, rock wool or other materials with low tubular metal section conductivity and high melting point, such as CERATEX® 3120G Ceramic Fiber Tape or similar, CERATEX® 3170G ceramic fiber paper or similar, MCALLISTER MILLS™ style SPG 650 MAXSIL® silica tape, MCALLISTER MILLS™ style SPG 1250 MAXSIL® silica tape or similar, or any other materials with low tubular metal section conductivity and high melting point. The insulation layer and/or the insulating, high temperature resistant material may be impregnated with high temperature resistant resins, lithium silicate, sodium silicate, potassium silicate or other refractory binders. In an example, the material of the insulation layer may have a tubular metal section conductivity of from between about 0.1 and about 1.6 W/(m° K) @ 650° C. and melting point between about 900° C. and about 1,800° C.

The insulation layer 30 may be positioned along the pocket portion of the weld cylinder 10 prior to insertion into the tubular section 50. The insulation layer 30 may be bonded or structurally anchored to external surface of the metal cylinder 10 with an adhesive such as a high-strength adhesive or any other method. For example, the insulation layer 30 may be applied to the external surface of the first metal cylinder by spraying, brushing, coating, or the like to a suitable thickness. Preferably, an aluminum oxide, $Al_2O_3$ (commercially available from ACCURATUS CORPORATION™ of Phillipsburg, N.J. at www.accuratus.com). The coating may be applied by a plasma spray process. Upon curing, drying or other finishing, the tubular metal section insulating, high temperature resistant material is anchored or otherwise connected to the first metal cylinder.

The external surface of the insulation layer 30 may also be bonded or structurally anchored or otherwise connected to the inner surface of the tubular section with an adhesive, such as an adhesive, a high-strength adhesive, high temperature resistant resins, lithium silicate, sodium silicate, potassium silicate, other refractory adhesives or any other method.

The weld backing ring 11a may be formed by inserting the first metal cylinder 10 into the end of the tubular section 50 and securing the metal cylinder 10 in place. The insulation layer 30 may be applied to the first metal cylinder 10 before insertion of the metal cylinder 10. In an example, the weld backing ring 11a may be pre-assembled by applying the insulation layer 30 to an outer surface of the first metal cylinder 10, and coaxially and adjustingly inserting the first metal cylinder 10 with the insulation layer 30 thereon into each one of the ends of the tubular sections 50 to be welded.

Optionally, the first metal cylinder 10 and the insulation layer 30 may be inserted together. The internal surface (34) of the insulation layer (30) may be structurally anchored to the external surface (11) of the metal cylinder (10) through high-strength adhesives or any other method. The external surface (31) of the insulation layer 30 (right circular hollow cylinder of tubular metal section insulating material) may be structurally anchored to the internal surface (54) of the tubular metal section (50) through high-strength adhesives or any other method.

During installation, the metal cylinder (10) is positioned into the end of the tubular metal section (50) so that the anterior face (12) of the metal cylinder (10) protrudes from the plane of the face of the weld bevel (52) of the tubular metal section (50) by the distance required to establish the specified root for the welding process adopted for the tubular metal section (50) when two tubular metal sections 50 are brought together for welding.

The protrusion distances from the plane of the face of the weld bevel of the tubular metal section may be zero or even negative. The protrusion distances from the plane of the face of the weld bevel of the tubular metal section may be zero different for two individual adjacent weld backing rings. For example, distances of protrusion of individual adjacent weld backing rings can be varied as long as the specified root gap is accounted for. weld backing ring. One weld backing ring can extend or protrude a distance equivalent 60% of a specified root gap and the adjacent second insulating weld backing ring can extend a distance of 40% of the specified root gap. The specified wedge gap varies from zero to typically 3.2 mm, although special projects may require larger gaps.

The insulation layer (30) is present, preferably in the form of a uniform layer on the external surface (11) of the metal cylinder (10). The plane of the anterior face (32) of the insulation layer (right circular hollow cylinder of tubular metal section insulating material) (30) may be essentially or substantially flush with the plane of the anterior face (12) of the metal cylinder (10).

Figure 3A:
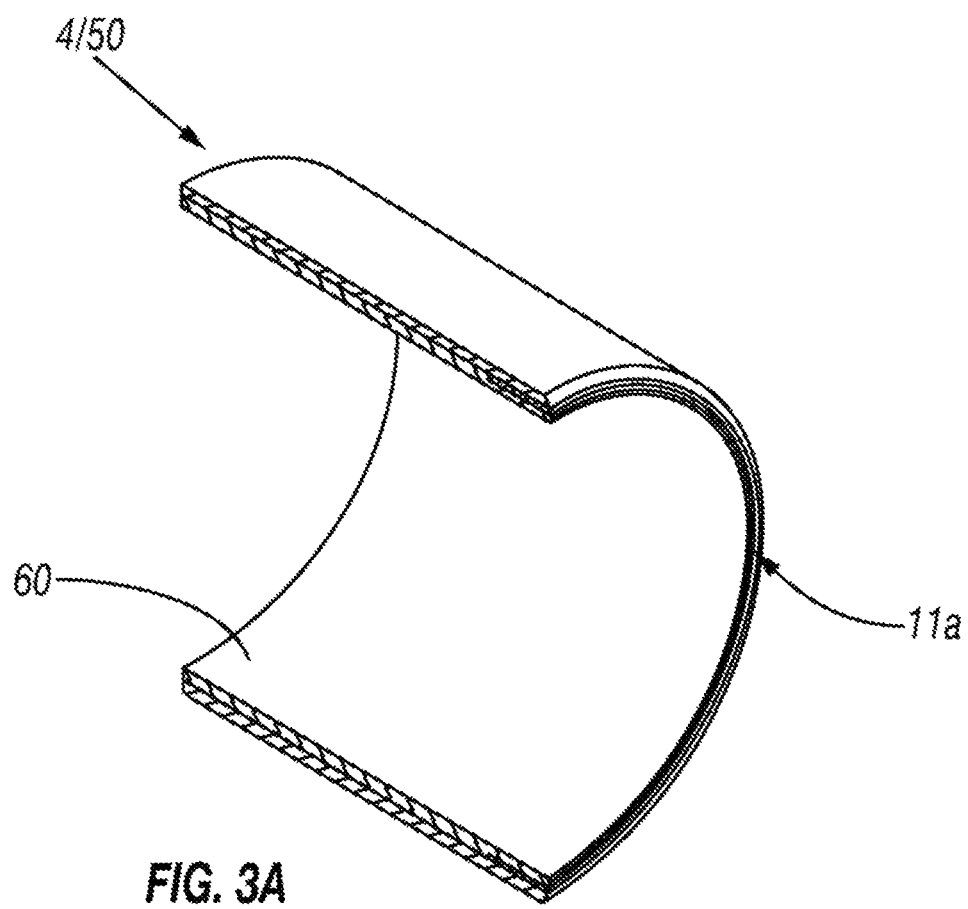
FIGS. 3A and 3B show longitudinal cross-sectional and detailed views, respectively, of the tubular section of FIGS. 2A and 2B with a pipe liner.
Figure 3B:
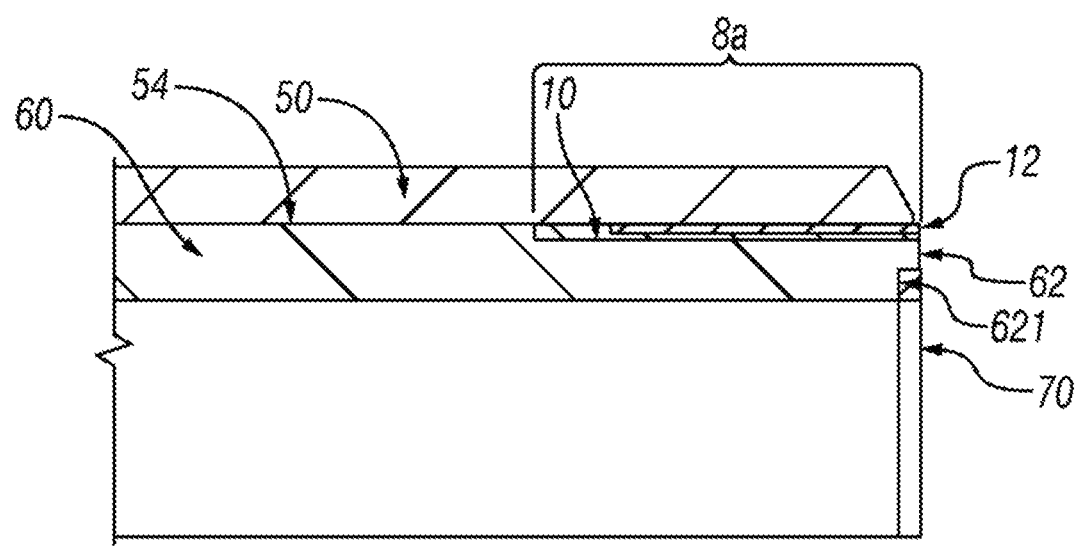

FIGS. 3A and 3B illustrate the tubular section 50 and the weld backing ring 8a as shown in FIGS. 2A and 2B, with an additional a pipe liner 60. The liner (60) may be applied to line the internal surface (14) of the first metal cylinder (10), along with the internal surface (54) of the tubular section (50). In the example shown, the liner 60 lines both the exposed internal surface 54 of the tubular section 50 and the exposed internal surface of the 14 of the first metal cylinder 10.

The liner 60 may be a coating or tubular insert that is positioned along an internal surface of the pipe section 4 to allow transport of the fluids therethrough. The liner 60 may be shaped to conform to the inner surface of the pipe section 4 and/or the weld backing ring 8a. The liner 60 may be a material designed to protect the internal surface 54 of the pipe section 4 as fluids pass therethrough.

The liner 60 may be made a material which has a resistance to corrosive and erosive processes. The liner 60 may be of any material capable of coating the pipe section 4, such as rubber, plastic, or other non-metal, corrosive resistant material, capable of protecting and/or supporting the pipe section 4 from within. Examples of liners that may be used are disclosed in Patent/Application Nos.

GB1444225, GB1533233, and US2016298811, the entire contents of which are hereby incorporated by reference herein.

The liner 60 may be applied or inserted into the pipe section 4 after insertion of the weld backing ring 8a and shaped to conform thereto. The liner 60 extends from one end of the pipe section 4 to an opposite end of the pipe section 4 along the internal surface 54. An anterior face (62) of liner (60) has a liner surface matable to the liner 60 of the adjacent pipe. The liner 60 also has a seat (621) along the anterior face 62. The seat 621 is a step along an end of the liner shaped to receive a sealing element (70).

The sealing element (70) may be any device capable of sealing with another sealing element of an adjacent tubular section 50. The sealing element 70 may be, for example, a ring-shaped member, such as an O-ring or gasket, seatable within the seat 621. The sealing element 70 is shaped to seal the interface with the corresponding anterior face 62 of the liner 60 (layer of internal lining material) of another weld backing ring 8a, when the abutting ends of the tubular metal sections (50) are brought together against each other for welding. The sealing element 70 may be made of a material, such as rubber, plastic, etc., that may facilitate sealing of the liner 60.

The liner 60 may be applied after insertion of the weld backing ring 8a to line both the exposed internal surface 54 of the tubular section 50 and the exposed internal surface of the first metal cylinder 10. The internal surface 54 of the tubular section 50 and the posterior face 13 of the metal cylinder 10 may be prepared to receive the liner 60. This preparation may include the construction of the metal cylinder 10 with the employment of expanded or perforated metal plates, which may provide a tridimensional anchor pattern to grip and/or support the liner 60.

Figure 4A:
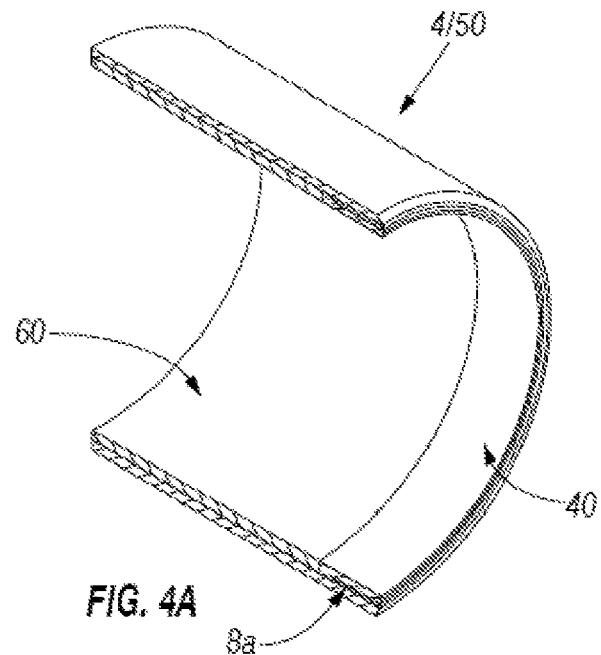
FIGS. 4A and 4B show longitudinal cross-sectional and detailed views, respectively, of the tubular section of FIGS. 2A and 2B with the pipe liner and a ring liner.
Figure 4B:
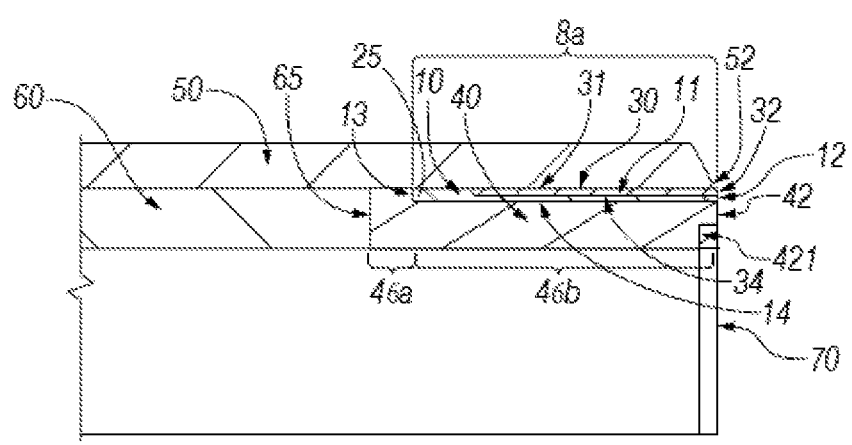
Figure 5A:
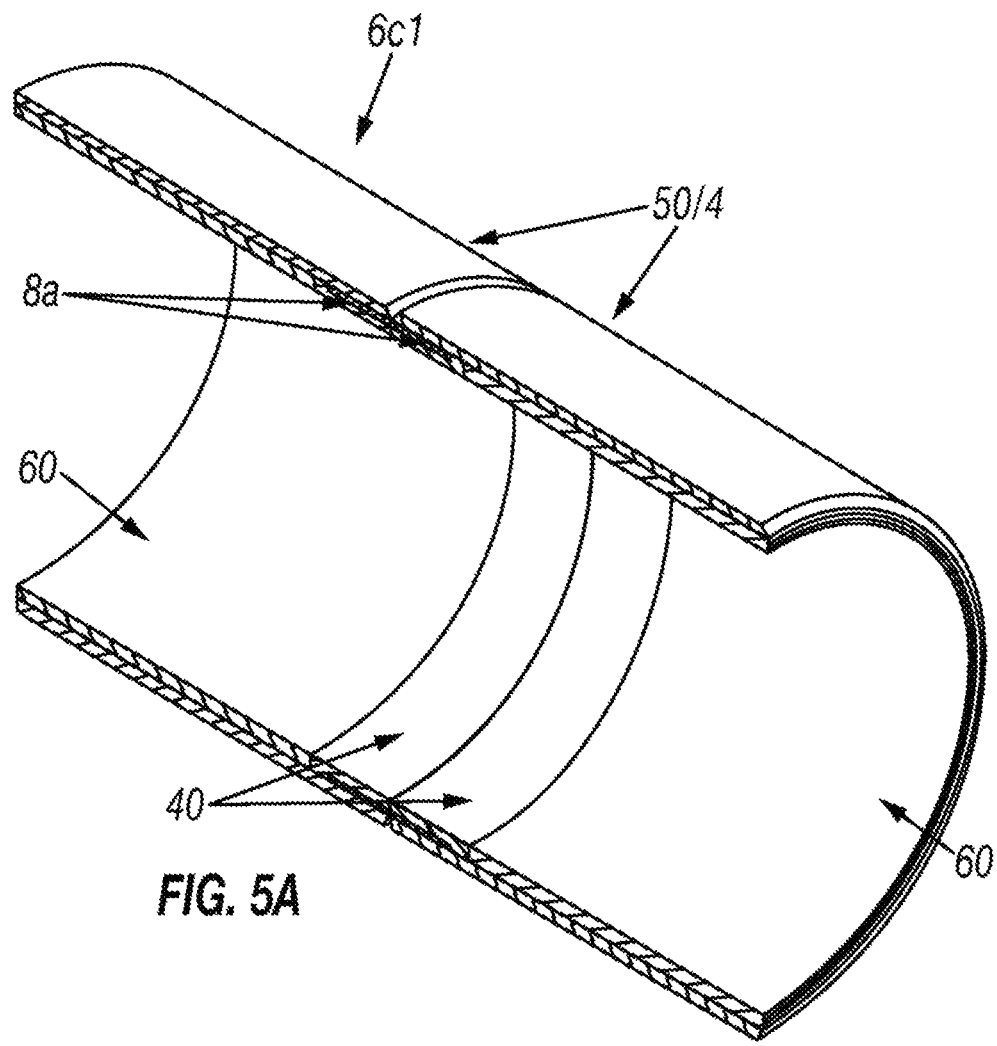
FIGS. 5A and 5B show longitudinal cross-sectional and detailed views, respectively, of the tubular sections of FIGS. 4A and 4B mated together to form the insulated butt weld joint.
Figure 5B:
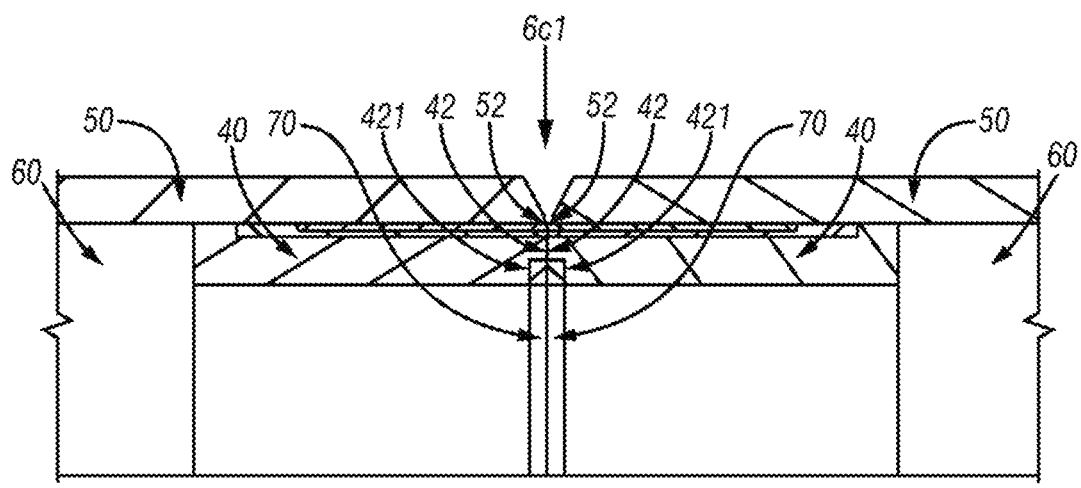

FIGS. 4A and 4B illustrate the tubular section 50 of FIGS. 3A and 3B with additional pipe liner 60 and ring liner 40. This version is similar to the version of FIGS. 3A and 3B, except that the pipe liner 60 terminates a distance from the end of the tubular section 50, and an additional ring liner (internal lining material) (40) is provided between the pipe liner 60 and the end of the tubular section.

The additional ring liner 40 is positioned along the inner surface of the tubular section 50 and covers the weld backing ring 8a. The ring liner (40) covers the internal surface (14) and posterior face (13) of the metal cylinder (10). The ring liner is provided in its posterior extremity with a flanged portion (45a) and at its anterior extremity a ring portion 45b with a step 25 therebetween. The flanged portion 45a is configured to confine, on the one side to the posterior face (13) of the metal cylinder (10) and on the other side, to the exposed anterior (cut) face (65) of the pipe liner (60) of the tubular sections (50). The flanged portion 45a is in contact with the internal surface 54 of the tubular section 50. The ring portion 45b is positioned adjacent the internal surface 14 of the first metal cylinder 10. The step 25 is positioned against the posterior face 13 of the metal ring.

The anterior face (42) of the ring liner (40) that covers the internal surface (14) and posterior face (13) of the metal cylinder (10) is provided with a seat (421) to receive additional sealing elements (70). The sealing element 70 may be provided at the end of the tubular section 50 at an interface with the corresponding ring liner 40 of an adjacent weld backing ring 8a when the abutting ends of the tubular sections (50) are brought together against each other for welding. The sealing element 70 may be a gasket, O-ring, or other sealing member supportable in the seat 421 and engageable with a sealing element 70 of an adjacent tubular section 50.

The ring liner 40 may be made of the same materials as the liner 60 or the insulation layer 30. The ring liner 40 may be provided as a separate piece cut from the liner 60 to allow for pre-assembly of the liner 40 with the weld backing ring 8a. The ring liner 40 may be a portion of the liner 60, or a separate ring liner 40 of similar or different materials. A strip of the layer of internal lining material of the liner (60) of the tubular metal section (50) may be removed in a width corresponding to the insulating weld backing ring, leaving exposed the anterior face (65) of the pipe liner (60) for use in the tubular section 50.

The liner 60 may be inserted prior to insertion of the weld backing ring 8a. The strip of the liner 60 may be removed from the pipe liner 60 before or after insertion of the pipe liner 60 to define a space along the inner surface of the tubular section 50 for receipt of the weld backing ring 8a and the ring liner 40. The weld backing ring 8a may be assembled by inserting the metal cylinder (10) and the insulation layer (30) into one end of the tubular metal section (50) as previously described. The weld backing ring 8a may be inserted into the end of the tubular metal section (50) so that the anterior face (12) of the metal cylinder (10) protrudes from the plane of the face of the weld bevel (52) of the tubular metal section (50), by the distance required to establish the specified root for the welding process adopted for the tubular metal section (50) when two tubular metal sections are brought together for welding. The distance of this protrusion may vary as noted herein.

The ring liner 40 may be pre-applied to the weld backing ring 8a prior to assembly for insertion with the weld backing ring 11a, or the liner 40 may be inserted and applied to the weld backing ring 8a after the weld backing ring 8a is inserted into the tubular section 50. The liner 40 may be secured to the metal cylinder 10 by any sealing means. A suitable adhesive and/or sealant may be applied to an interface between the first metal cylinder 10 and the liner 40. The material may be selected in order to ensure the integrity and continuity of the liner 40 from one end to the other of the tubular metal sections (50) about the metal cylinder 10. The sealing element 70 may be inserted with the liner 40 during preassembly of the weld backing ring 8a, or after insertion of the weld backing ring 8a and the ring liner 40.

FIGS. 5A and 5B illustrate a welded butt joint 6c1 between two tubular sections 50 with standard ends. The butt joint 6c1 of these figures is formed between tubular sections 50 of two adjacent tubular sections 50. The tubular sections 50 include the weld backing ring 8a and liners 40,60 as shown in FIGS. 4A and 4B. The weld backing rings 8a are inserted into each one of the abutting ends of said tubular sections 50.

The faces of the abutting welding bevels (52) of the two tubular sections (50) were brought together against each other, until each of the layers of the weld backing ring 8a inserted into the end of a tubular metal section (50) fit evenly and without gaps to its counterpart of the weld backing ring 8a inserted into the abutting end of the other tubular metal section (50). The tubular sections 50 are mated so that the additional sealing elements (70) installed at the seats (421) provided on the anterior faces (42) of the ring liner (40) of each of the insulating weld backing rings are properly compressed against the seats (421), sealing the ends of the ring liner (40) of each one of the abutting ends of the two tubular sections (50).

In the example of FIGS. 5A and 5B, the two tubular sections 50 in the abutting ends have coaxially and adjustingly received the weld backing rings 8a therein. The tubular sections may be brought together with the use of a commercially available alignment device, similar to the tool described in U.S. Pat. No. 5,052,608, the entire contents of which is hereby incorporated by reference herein. The abutting ends of the two tubular sections 50 one against the other are mated so that each of the layers of the weld backing ring 8a inserted into one end of one tubular section 50 adjust evenly and without voids to its counterpart layer of the weld backing ring 8a of the other tubular section. In this way, the sealing member 70 provided to the abutting faces of the ring liners (layers of internal lining material) 40 of each of the weld backing rings can be properly compressed to seal the interface between these ring liners 40 (layers of internal lining material). Each one of the weld backing rings 8a is coaxially and adjustingly inserted into the end of the respective tubular section 50 so that its anterior face protrudes the same distance from the plane of the face of the weld bevel and the contact between the two abutting anterior faces of said rings establish the specified gap for the welding process adopted.

The welding of the abutting ends of the tubular sections 50 may be accomplished by any of the welding processes ordinarily employed for the construction of piping systems and pipelines not provided with internal lining of heat sensitive material. In addition, the welding procedure may incorporate techniques, such as those outlined in U.S. Pat. No. 3,508,766, the disclosure of which is incorporated herein by reference. The welding may be performed in a manner to minimize heat buildup and to release the gases heated by the high temperatures resulting from welding to prevent damage to the sealing means employed. The first passes of the girth weld of the abutting ends of the tubular sections may leave a ventilation gap from the root of the weld up, to allow for the escape of these gases. Later, after the region of the joint cools off, the girth weld may be completed to close the ventilation gap to produce a watertight (or fluid tight) and corrosion resistant joint.

FIGS. 6A-8B show the tubular section 50 with another version of the weld backing ring 8b in a dual configuration. FIGS. 9A-9B show the tubular section 50 and dual weld backing ring 8b in a butt joint 60b between adjacent tubular sections 50. The weld backing ring 8b is the same as the weld backing ring 8a, except that a second metal cylinder (metal right circular hollow cylinder) 20 is provided along the outer surface of the insulation layer 30 between the weld backing ring 8a and the internal surface 54 of the tubular section 50.

Figure 6A:
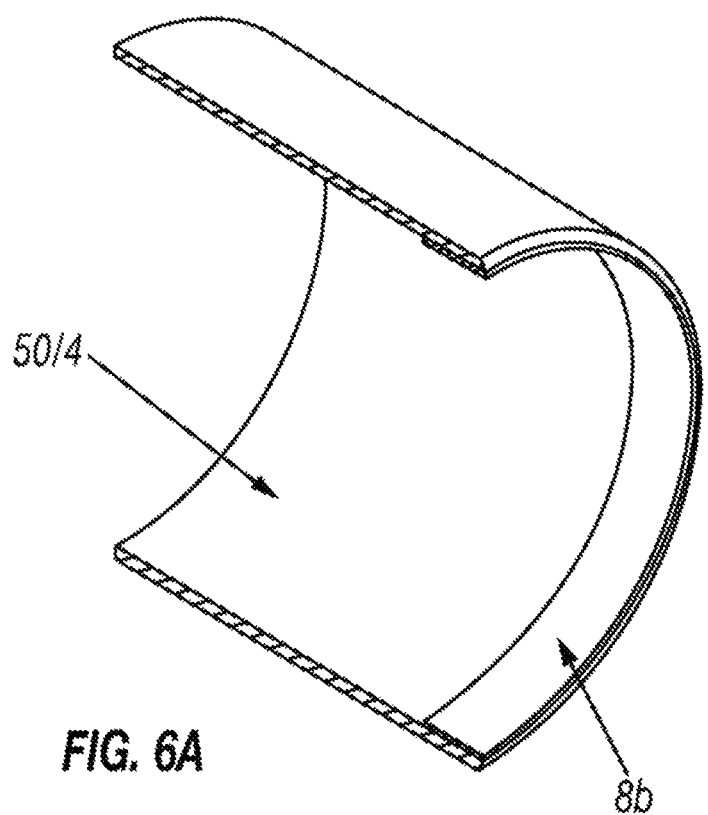
FIGS. 6A and 6B show longitudinal cross-sectional and detailed views, respectively, of the tubular section with a weld backing ring in a dual configuration and without the liner.
Figure 6B:
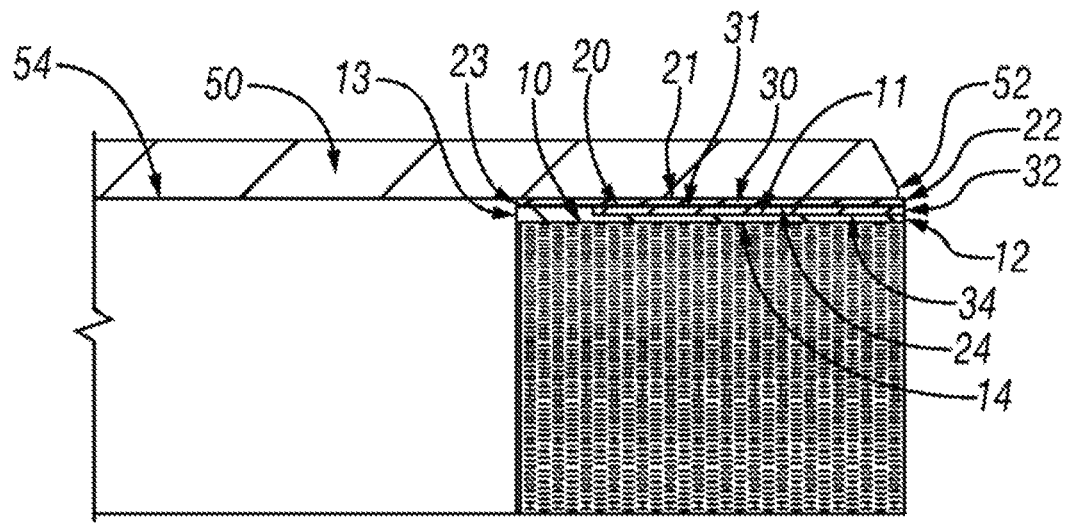

FIGS. 6A-6B illustrates a detailed view of the weld backing ring 8b devoid of the liner 60. This version of the weld backing ring 8b includes the first metal cylinder (10) and the insulation layer (30) as previously described. This version of the weld backing ring 8b also includes a second metal cylinder (20) positioned between the weld backing ring 8a and the tubular section 50.

The second metal cylinder 20 may be secured between the tubular section 50 and the first metal cylinder 10 and the insulation layer 30. The second cylinder (20) is located outside of the first metal cylinder (10) in relation to the longitudinal axis of the weld backing ring 8d. Thus, the second cylinder (20) has a larger circumference than the first metal cylinder (10). The second metal cylinder 20 is positioned in the tubular section such that a plane of the anterior face (22) of the second metal cylinder (20) is essentially flush with the plane of the anterior face (12) of first metal cylinder (10). The flange portion of the first metal cylinder (10) contacts the internal surface (24) of the second metal cylinder (20).

The external surface (31) of the insulation layer (30) may be structurally anchored to the internal surface (24) of the second metal cylinder (20) by means of high strength adhesives or any other method, similar to the adhesives used to secure the insulation layer 30 to the first metal cylinder 10. The internal surface (24) of the second metal cylinder (20) may be structurally anchored to the flange portion (45a) of the first metal cylinder (10) by means of welding, brazing or any other method, similar to the anchoring used to secure the first metal cylinder 10 to the tubular section 50. The posterior face (23) or the external surface (21) of the second metal cylinder (20) may be structurally anchored to the internal surface (54) of the tubular section (50) by means of the welding, brazing or any other method.

The second metal cylinder (20) is a tubular member may be made of the same material as the first metal cylinder 10 and/or the tubular section 50. The material may be any metal material, compatible with the metal of the tubular section 50, such as carbon steel, alloy steel, stainless steel, aluminum, copper or nickel alloys or titanium. The second metal cylinder 20 may be formed or rolled from a metal sheet strip.

The second metal cylinder 20 may be inserted into the standard end of a tubular metal section (50) before or with insertion of the weld backing ring 8a. The second metal cylinder 20 may be pre-assembled with the weld backing ring 8a to form the weld backing ring 8b prior to insertion. The second metal cylinder 20 may be bonded (adhered, locked, coupled, or made integral) to the outer surface of the weld backing ring 8a in engagement with the flange portion 17a of the first metal cylinder 10 and the insulation layer 30 prior to insertion. Once inserted, the second metal cylinder 20 may be bonded to the internal surface 54 of the tubular section 50, thereby securing the weld backing ring 8b in position in the tubular section 50.

Figure 7A:
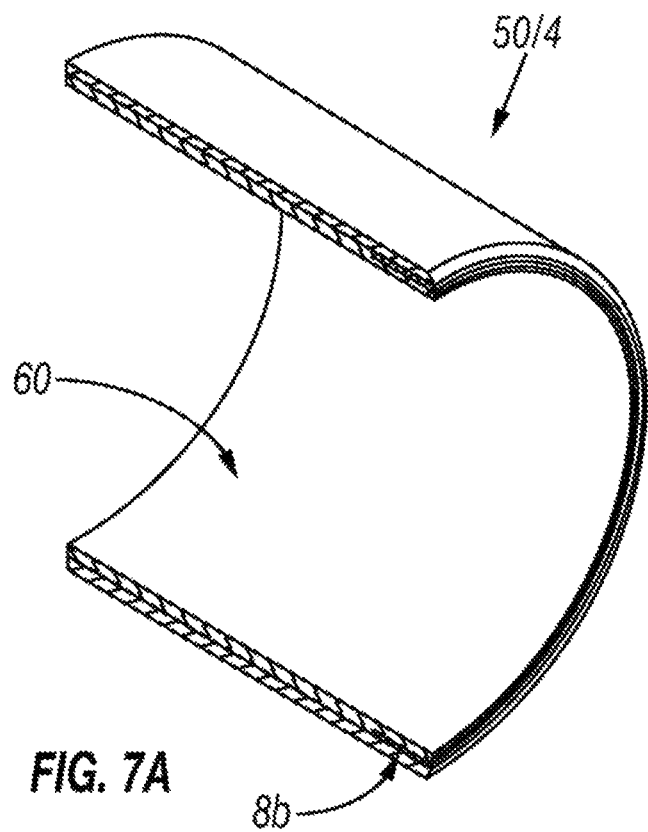
FIGS. 7A and 7B show longitudinal cross-sectional and detailed views, respectively, of the tubular section of FIGS. 6A and 6B with the pipe liner.
Figure 7B:
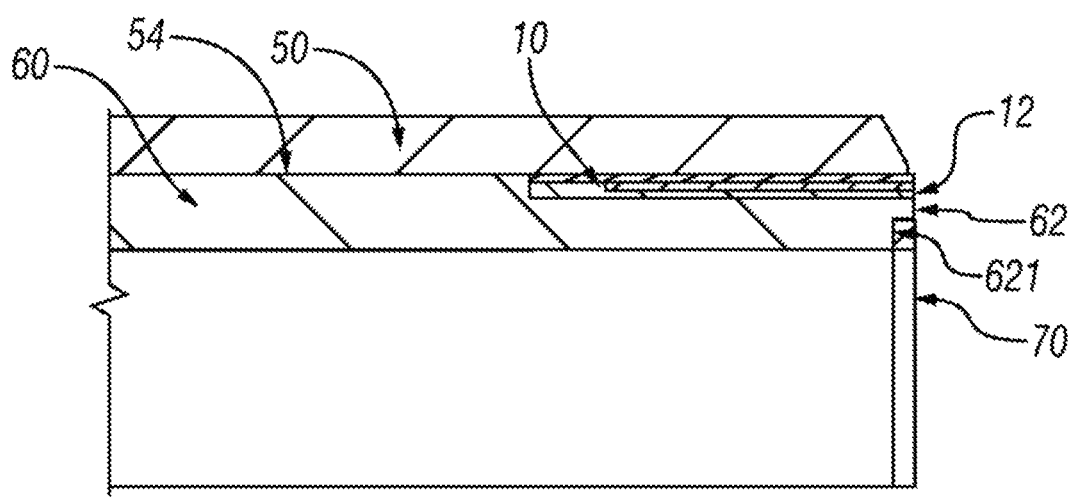

FIGS. 7A and 7B illustrate the weld backing ring 8b with the pipe liner 60. In this version, the weld backing ring 8b may be inserted into the standard end of the tubular section (50) as described in FIGS. 6A and 6B. The tubular section 50 subsequently receives the pipe liner (60) that extends along the internal surface (54) of the tubular metal section (50). The pipe liner 60 may be provided with a seat 621 and seal 70 as previously described in FIGS. 3A and 3B. The pipe liner 60 may be applied to the tubular section 50 and the weld backing ring 8b as also previously described with respect to FIGS. 3A and 3B.

Figure 8A:
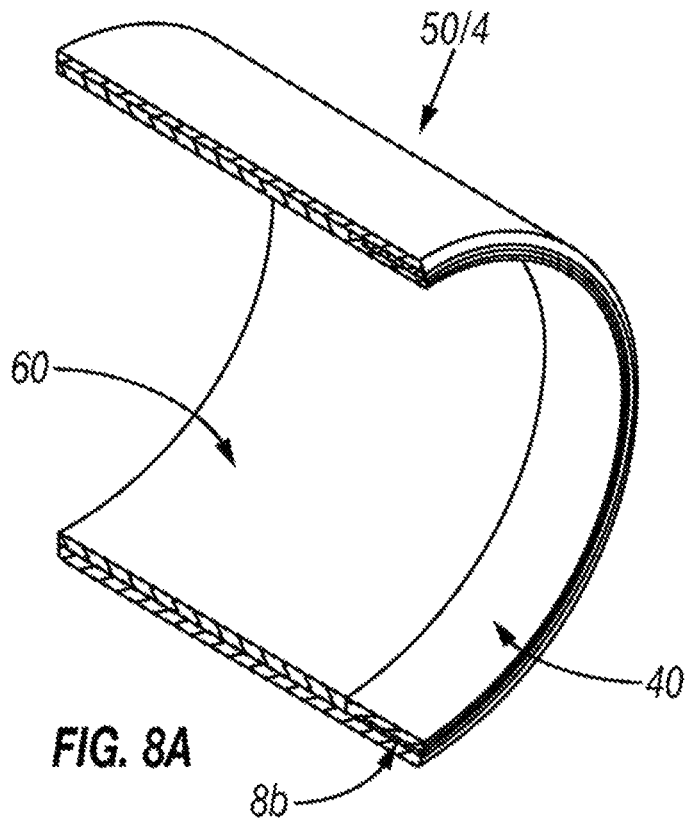
FIGS. 8A and 8B show longitudinal cross-sectional and detailed views, respectively, of the tubular section of FIGS. 6A and 6B with the pipe liner and the ring liner.
Figure 8B:
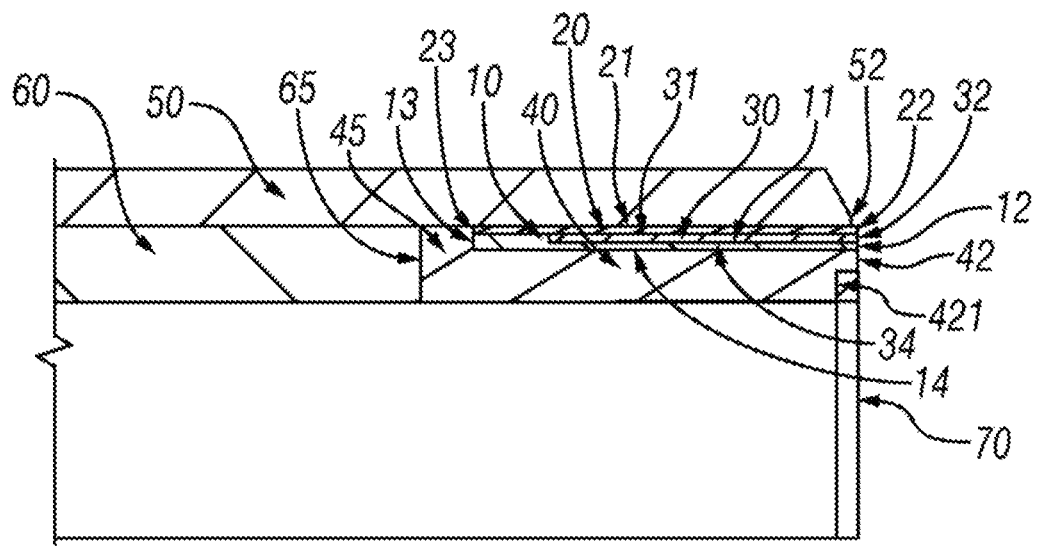
Figure 9A:
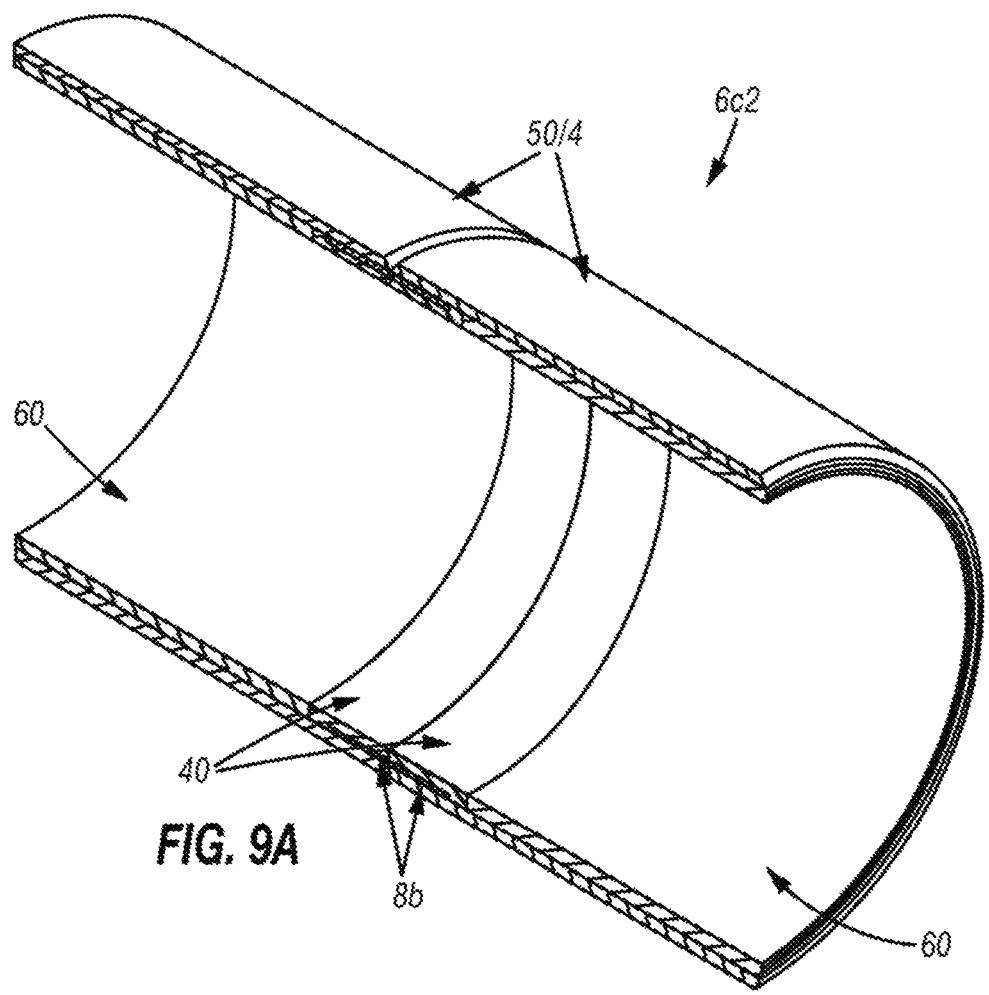
FIGS. 9A and 9B show longitudinal cross-sectional and detailed views, respectively, of the portion of the pipe sections of FIGS. 8A and 8B mated together to form the insulated butt dual weld joint.
Figure 9B:
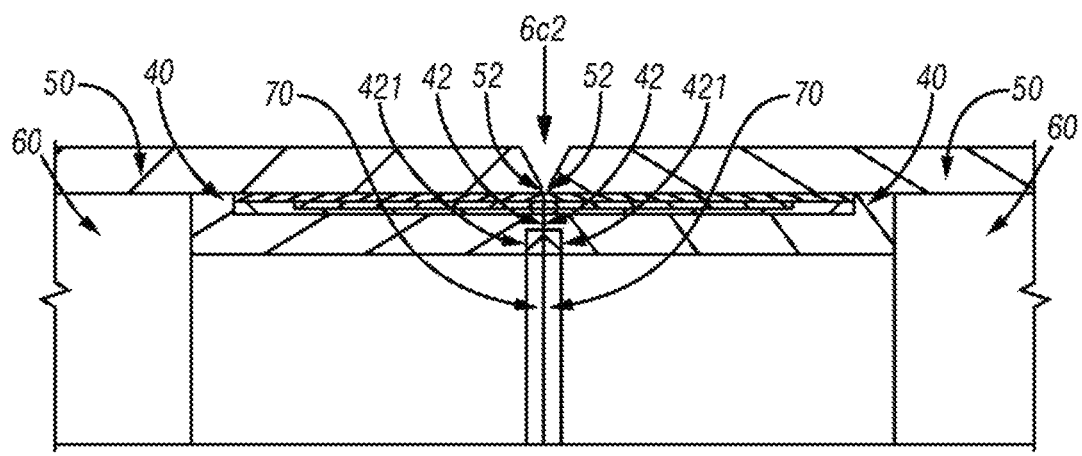

FIGS. 8A and 8B illustrates the tubular section 50 including the weld backing ring 8b of FIGS. 6A and 6B. In this version, the tubular section 50 is provided with the pipe liner 60 and the ring liner 40 as previously described in FIGS. 4A and 4B. The weld backing ring 8b may be assembled as previously described, and the pipe liner 60 and the ring liner 40 may be applied onto the tubular section 50 and the weld backing ring 8b after installation of the weld backing ring 8b into the tubular section 50. Alternatively, the ring liner 40 may be removed from the pipe liner 60 and pre-assembled with the weld backing ring 8b prior to assembly in a similar manner as described in FIGS. 4A and 4B.

An example assembly of the weld backing ring 8b with the liners 60, 40 involves pre-assembling the ring liner (40), with the first metal cylinder (10), the insulation layer (30), and the second metal cylinder (20) to form the weld backing ring 8b. The weld backing ring 8b is then, inserted into the standard end of a tubular section (50), also provided with the pipe liner (60). A strip of the liner (60) of the tubular metal section may be previously removed from the pipe liner 60 in a width corresponding to the weld backing ring 8b, leaving exposed the anterior face (65) of the pipe liner (60). The weld backing ring 8b may be positioned into the end of the tubular metal section (50) so that the anterior face (12) of the first metal cylinder (10) protrudes from the plane of the face of the weld bevel (52) of the tubular metal section (50), by the distance required to establish the specified root for the welding process adopted for the tubular section (50) when two tubular sections (50) are brought together for welding. The distance of this protrusion may vary as noted herein.

The insulation layer (30), is present as a uniform layer on the external surface (11) of the first metal cylinder (10). The plane of the anterior face (32) of the insulation layer (30) may be essentially or substantially flush with the plane of the anterior face (12) of the first metal cylinder (10). The internal surface (34) of the insulation layer (30) may be structurally anchored to the external surface (11) of the first metal cylinder (10) by means of high-strength adhesives or any other method.

The second metal cylinder (20) is laid out on the external surface (31) of the insulation layer (30). The plane of the anterior face (22) of the second metal cylinder (20) may be essentially flush with the plane of the anterior face (12) of the first metal cylinder (10). A flange portion (45a) of the first metal cylinder (10) contacts the internal surface (24) of the second metal cylinder (20). The external surface (31) of the insulation layer (30) may be structurally anchored to the internal surface (24) of the second metal cylinder (20) by means of high strength adhesives or any other method. The internal surface (24) of the second metal cylinder (20) may be structurally anchored to the flange portion (45a) of the first metal cylinder (10) by means of welding, brazing or any other method. The posterior face (23) or the external surface (21) of the second metal cylinder (20) may be structurally anchored to the internal surface (54) of the tubular metal section (50) by means of welding, brazing or any other method.

The liner (40) that covers the internal surface (14) and posterior face (13) of the first metal cylinder (10) is provided in its posterior end with a flange portion (45a) that is configured to confine, on the one side to the posterior face (13) of the first metal cylinder (10) and on the other side, to the exposed anterior face (65) of the liner (60) of the of the tubular metal sections (50). A suitable adhesive and/or sealant is applied to this interface in order to ensure the integrity and continuity of the internal lining from one end to the other of the tubular metal sections (50). The anterior face (42) of the ring liner (40) that covers the internal surface (14) and posterior face (13) of the first metal cylinder (10) is provided with a seat (421) to receive an additional sealing element (70) of the interface with the corresponding liner of a second insulating weld backing ring when the abutting ends of the tubular metal sections (50) are brought together against each other for welding.

FIGS. 9A-9B illustrate a butt joint 6c2 formed of two tubular sections 50 with weld backing rings 8b as previously described in FIGS. 8A and 8B. The adjacent tubular sections 50 are prepared for welding with insulating weld backing rings 8b. The tubular sections 50 were previously provided with the liner 60 and the weld backing ring 8b was provided with the liner (40). The weld backing rings 8b includes the first metal cylinder (10), the insulation layer (30), and the second metal cylinder (20) inserted into each one of the abutting ends of the two tubular metal sections (50), and the liner (60) as shown in FIGS. 8A and 8B.

The adjacent tubular sections 50 and the weld backing rings 8b are welded together in a similar fashion as described with respect to the welded pipe sections of FIGS. 5A and 5B, except with the additional welding of the second metal cylinder 20. In an example, the faces of the abutting welding bevels (52) of the two tubular metal sections (50) were brought together against each other, until each of the layers of the weld backing ring 8b inserted into the end of a tubular metal section (50) fit evenly and without gaps to its counterpart of the insulating weld backing ring inserted into the abutting end of the other tubular section (50) so that the additional sealing elements (70) installed at the seats (421) provided on the anterior faces (42) of the layers of ring liners (40) of each of the insulating weld backing rings are properly compressed against the seats (421), sealing the pipe and ring liners (60, 40) of the two tubular sections (50).

FIGS. 10A-13B illustrate various optional features that can be used in the weld backing rings 8a,b described herein. For descriptive purposes, the weld backing rings 8c-f are depicted outside of the tubular section 50. It will be appreciated that the weld backing rings 8c-f may be installed into the tubular section 50 as previously described. Each of these weld backing rings 8c-f are depicted as including the first metal cylinder 10, the insulation layer 30, the second metal cylinder 20, and the liner 40 as described, for example in FIGS. 7A and 7B, together with different additional features or variations. As shown in FIGS. 10A-12B, the second metal cylinder 20 may be mechanically or metallurgically integrated or connected to the first metal cylinder by various means, such as a) a raised or outwardly extending portion of the first metal cylinder welded or brazed to the second metal cylinder; b) a raised or inwardly extending portion of the second metal cylinder welded or brazed to the first metal cylinder; c) a spacer ring welded to the first metal ring and to the second metal ring, d) by means of a fold in the first metal cylinder welded to the second metal cylinder, e) by means of a fold in the second metal cylinder welded to the first metal cylinder, f) a plurality of spacer pins or tabs welded or brazed to the first metal cylinder and to the second metal cylinder; g) a fold or closed hem in the first metal cylinder welded to the second metal cylinder; h) a fold or closed hem in the second metal cylinder welded to the first metal ring; i) a fold or closed hem in the first metal cylinder welded to a fold or closed hem in the second metal cylinder; or j) by the construction of the first and second metal cylinders from the same metal plate folded in two or by any other constructive method. The posterior face or the external surface of the second metal cylinder may be structurally anchored to the internal surface of the tubular metal section through spot welding, brazing, high-strength adhesives or any other method.

Figure 10B:
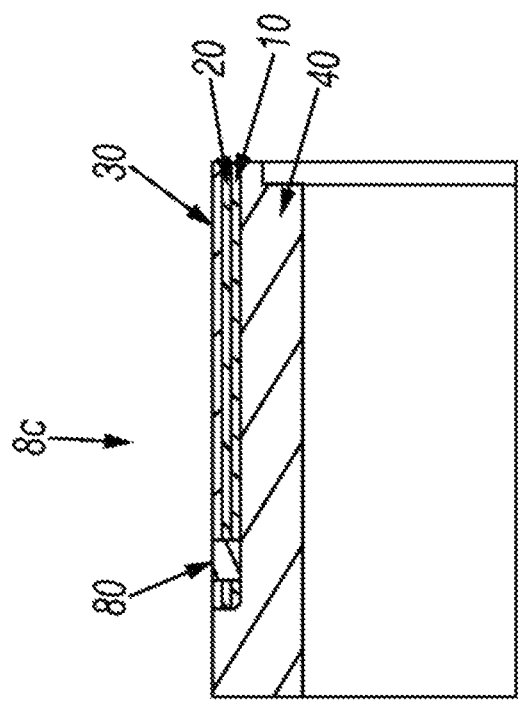
FIGS. 10A and 10B show perspective and cross-sectional views, respectively, of the dual weld backing ring of FIGS. 7A and 7B with spacers.
Figure 10A:
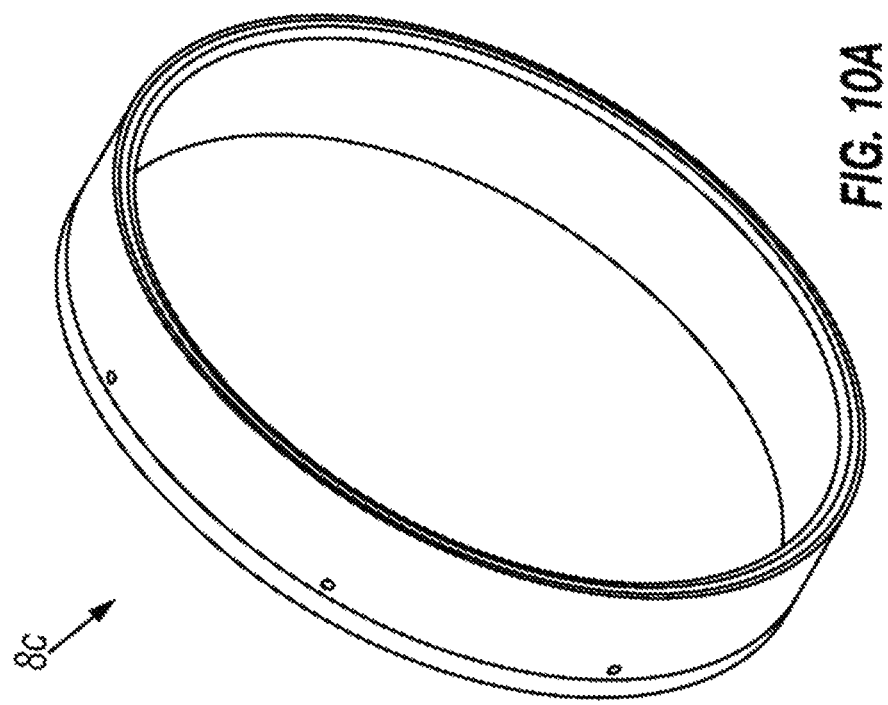

FIGS. 10A and 10B illustrate a weld backing ring 8c in a spaced configuration. This version is similar to the weld backing ring 8b of FIGS. 7A and 7B, except that the second metal cylinder (20) is spaced from the first metal cylinder (10) by a combination of spacers (metal studs) (80) and the insulation layer (30). The metal spacers 80 are positioned adjacent a posterior face 13 of the first metal cylinder 10. The metal spacer 80 may be made of carbon steel to mechanically lock the second metal cylinder (20) to the first metal cylinder 10.

FIGS. 11A and 11B illustrate a weld backing ring 8d in an integrated cylinder configuration. In this version, the first and second metal cylinders 10, 20 are joined into an integrated metal cylinder 20'. In particular, the first metal cylinder (10) and the second metal cylinder (20) are integrally joined or connected at posterior end portions thereof.

The insulation layer 30 is present between the first metal cylinder (10) and the second cylinder (20) and in contact with either the first metal cylinder (10), the second cylinder (20), or both the first metal cylinder (10) and the second metal cylinder. (20) The first metal cylinder (10), the second metal cylinder (20), and the insulation layer (30) each have an anterior end portion having an exposed anterior face (12, 22 and 32). The insulating weld backing ring also includes a liner (40) positioned about the weld backing ring 8d.

In an example, the weld backing ring 8d may be formed by starting with a metal sheet strip or another suitable piece of metal, a tubular metal section material is applied to at least one surface thereof. The tubular metal section material can be applied to a portion of the metal sheet strip or piece that will become the first metal cylinder 10 and/or the second metal cylinder 20. The tubular metal section material can be applied by any suitable method including, but not limited to, spraying, brushing, coating, adhering a flexible tape or strip, or the like.

In a further step, the metal sheet strip is folded along a desired axis. The metal sheet strip may be hemmed or folded back upon itself such that the free ends thereof form the anterior sections of the first metal cylinder 10 and the second metal cylinder 20. The cylinders 10, 20 may be formed to have end faces in substantially the same plane. The folded metal sheet strip can be considered as having a "U"-like shape as shown in FIGS. 11A and 11B. The metal sheet strip is then additionally rolled and processed to join terminal ends to form the integrated first and second metal cylinder 20', with the tubular metal section material defining the insulation layer 30 therebetween.

FIGS. 12A and 12B illustrate a weld backing ring 8e in an integrated and slotted configuration. This version includes the integrated first and second metal cylinder 20' and insulation layer 30 as in FIGS. 11A and 11B. In this version, the integrated first and second metal cylinder 20' has perforations (or slots) 90 therein. The perforations 90 are spaced along a periphery of the integrated first and second metal cylinder 20'. The perforations 90 may be cut into the sheet of metal used to form the integrated first and second metal cylinder 20' prior to folding as described in with respect to FIGS. 11A and 11B. The perforations 90 may be located along a posterior end of the integrated first and second metal cylinder 20'. The location and shape of the perforations 90 may be defined to reduce heat transfer between the first metal cylinder 10 and the second metal cylinder 20 of the integrated first and second metal cylinder 20'.

FIGS. 13A and 13B illustrate a weld backing ring 8f in a flat cylinder configuration. This version is similar to the weld backing ring 8b of FIGS. 7A and 7B or the weld backing ring 8c of FIGS. 11A and 11B. In this version, the first metal cylinder 10 has been modified so that it has a flat outer surface with no step or pocket defined. Also, the posterior ends of the first metal cylinder 10, the insulation layer 30, and the second metal cylinder are flush against the flange portion 45a of the liner 40. The insulation layer 30 is positioned between the outer surface of the first metal cylinder 10' and the inner surface of the second metal cylinder 10' as previously described. In this version, the insulation layer 30 has a posterior end that is flush with the posterior ends of the first metal cylinder 10' and the second metal cylinder 20.

The tubular members of the various weld backing rings 8a-f described herein employ tubular first metal cylinders 10, 10', second metal cylinders 20, integrated first and second metal cylinders 20', insulation layers 30, and liners 40. These tubular members may be pre-assembled for insertion into the tubular section 50 to support and protect the tubular section 50 during welding of the tubular section 50 to an adjacent tubular section 50. The first metal cylinder 10 may be used to provide support and mechanical protection to the insulation layer 30, also serving as secondary heat shield and mechanical anchoring for the underlying liner 40. The first metal cylinder 10 is adhered to the liner 40 in an analogous manner as the liner 60 of the tubular metal sections 50 is adhered to the internal surface of the first metal cylinder 10 or integrated first and second metal cylinder 20'. The first metal cylinder 10 may be built with the use of expanded or perforated metal sheet strips (see, FIG. 2B), which provide a three-dimensional anchoring pattern for grippingly engaging the liner 40.

The insulation layer 30 may be used to prevent the transfer of the heat generated during welding operations in the direction of the thickness of tubular metal sections 50, which is the shortest geometrically path between the highest temperature, at the root of the weld, and the liner 40 that lies directly below this area. The remaining unimpeded paths to the heat flow may be along the circumference and along the length of the tubular metal sections, with the consequent dissipation of this heat to the walls of the tubular metal sections and to the external environment, leading to a reduction of the temperatures that reach the liner 40. The second metal cylinder 20 provides support and mechanical protection to the insulation layer 30.

During the welding of the root pass of the tubular metal sections 50, the area of contact between the abutting anterior faces of the second metal cylinder 20 of each one of the adjacent weld backing rings is fully melted and incorporated into the root of the weld between the two tubular metal sections 50. When mechanical or metallurgical integration between the first metal cylinder and the second metal cylinders, combined with the construction of the first metal cylinder from expanded or perforated metal sheet strips, has been employed, the liner 40 may be firmly anchored to the base material of the tubular metal sections 50.

When the second metal cylinder 20 is present, the employment of intermittent metal connection between the first metal cylinder 10 and the second metal cylinder 20 as shown in the embodiments illustrated in FIGS. 10A, 10B, 12A, and 12B, further limits the amount of heat that can be transferred, while an adequate mechanical connection between the first metal cylinder 10 and the second metal cylinder 20 is still maintained. When this mechanical connection is not necessary, the embodiment illustrated in FIGS. 13A and 13B may reduce that heat flow even more.

FIG. 14 is a flow chart depicting a method of welding adjacent pipe sections of a pipeline. The method involves 91 pre-assembling a weld backing ring by 91a providing a sheet of metal, 91b applying an insulation layer (material) onto an external surface of the sheet of metal, and 91c rolling the sheet of metal into a first metal cylinder. The method 91 further involves 92 insulating a tubular section of each of the adjacent pipe section from welding heat by: 92a inserting the pre-assembled weld backing ring into an end of the tubular sections of each of the adjacent pipes, 92b positioning an anterior end of each of the first metal cylinders flush with the end of the tubular sections of each of the adjacent pipes, and 92c securing the pre-assembled weld backing rings to an internal surface of the tubular section of each of the adjacent pipes. The method continues with 94 positioning the ends of each of the adjacent pipes together with the anterior ends of the pre-assembled weld backing ring of each of the adjacent pipes in contact, and 95 forming a weld between the adjacent pipe section by applying the welding heat to each of the adjacent pipes sections.

The method optionally may involve 96*a* applying a second sheet of metal onto the insulation layer (tubular metal section insulating) material on the external surface of the insulation layer to form a second metal cylinder and where the securing comprises bonding the second metal cylinder to the internal surface of the tubular section; 96*b* integrating a posterior end of the first metal cylinder with a posterior end of the second metal cylinder; 96*c* folding over a posterior portion of the sheet of metal onto the external surface of the sheet of metal, wherein the rolling the sheet of metal into the first metal cylinder further comprises rolling the folded posterior portion into a raised ring along the external surface of the first metal cylinder, and wherein the securing the pre-assembled weld backing ring comprises bonding the raised ring to the internal surface of the tubular section; 96*d* folding over a posterior portion of the sheet of metal onto the external surface of the sheet of metal, wherein the rolling the sheet of metal into the first metal cylinder further comprises rolling the folded posterior portion into a second metal cylinder, and wherein the securing the pre-assembled weld backing ring comprises bonding the second metal cylinder to the internal surface of the tubular section; 96*e* securing comprises bonding together at least two of: the first metal cylinder, the insulation layer, a liner sealing element, a second metal cylinder, and the tubular section. The method may also involve applying and rolling performed simultaneously, and securing by bonding together at least two of: the first metal cylinder, the insulation layer, a liner sealing element, a second metal cylinder, and the tubular section.

Portions of the method may be performed in any order and repeated as desired.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "upper", "down," "lower", "top", "bottom", "anterior" and "posterior" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Part or all of the assembly may be performed on or offsite from the wellsite. Portions of the method may be performed in various orders, and part or all may be repeated.

While the embodiments are described with reference to various implementations and exploitations, it will be understood that these embodiments are illustrative and that the scope of the inventive subject matter is not limited to them. Many variations, modifications, additions and improvements are possible. For example, various combinations of one or more of the features and/or methods provided herein may be used.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter. For example, while certain connectors are provided herein, it will be appreciated that various forms of connection may be provided. While the figures herein depict a specific configuration or orientation, these may vary. First and second are not intended to limit the number or order.

The invention claimed is:

1. A pre-assembled insulated weld backing ring for a pipe section of a pipeline, the pipeline having a passage therethrough for transporting fluids between locations, the pipe section comprising a tubular member having a tubular section at each end, the tubular section weldably connectable to a tubular section of an adjacent pipe section, the weld backing ring comprising:
 a first metal cylinder having a tubular body positionable in the tubular section and coaxially secured therein, the first metal cylinder having a stepped external surface defining a ring shaped anterior portion and a ring shaped raised posterior portion with a step therebetween, the anterior portion having an anterior face positioned about the end of the tubular section for abutting engagement with a corresponding anterior face of a first metal cylinder of an adjacent tubular member of the pipeline, the posterior portion having a larger diameter than the anterior portion to define an insulation pocket between an external surface of the anterior portion and an internal surface of the tubular section when positioned in the tubular section, the insulation pocket having an open end about an anterior face of the tubular section and a terminal end adjacent the step, an external surface of the posterior portion positioned in one of engagement and non-engagement with the internal surface of the tubular section when the first metal cylinder is secured in the tubular section; and
 an insulation layer positioned on the external surface of the first metal cylinder for insertion into the tubular section with the first metal cylinder, the insulation layer having a posterior end positioned against the step of the first metal cylinder, the insulation layer having an anterior end positioned about the end of the tubular section for abutting engagement with a corresponding anterior end of a insulation layer of the adjacent tubular member, the insulation layer comprising a tubular metal section insulating material positioned in the insulation pocket to define a protective barrier between the first metal cylinder and the tubular member when installed in the tubular section whereby the tubular member is protected from heat during welding of the tubular member to the adjacent tubular member; and
 a second metal cylinder positioned between the insulation layer and the tubular member;
 wherein the second metal cylinder is positioned along the external surface of the posterior portion of the first metal cylinder and the external surface of the insulation layer.

2. The weld backing ring of claim 1, further comprising a ring liner disposed over an internal surface of the first metal cylinder, the ring liner comprising a corrosively and/or erosively resistant material.

3. The weld backing ring of claim 2, wherein the ring liner has a seat along an anterior end thereof, the weld backing ring further comprising a sealing element positioned in the seat of the ring liner to sealingly engage the sealing element of the adjacent tubular member.

4. The weld backing ring of claim 2, wherein the first metal cylinder has a surface with an anchoring pattern to grippingly engage the ring liner.

5. The weld backing ring of claim 1, wherein a posterior end of the first metal cylinder and a posterior end of the second metal cylinder are integral, and wherein the integral posterior end of the first metal cylinder and the posterior end of the second metal cylinder have perforations therethrough.

6. The weld backing ring of claim 1, wherein the external surface of the posterior portion of the first metal cylinder and the external surface of the insulation layer are positionable along the internal surface of the tubular section.

7. The weld backing ring of claim 1, wherein the tubular metal section insulating material comprises a temperature resistant material with a tubular metal section conductivity between 0.1 and 1.6 W/(m° K) at 650° C. and a melting point between 900° C. and 1,800° C.

8. The weld backing ring of claim 7, wherein the tubular metal section insulating material comprises at least one of ceramic fiber, fiberglass, rock wool, ceramic fiber tape, ceramic fiber paper, silica tape, high temperature resistant resins, lithium silicate, sodium silicate, potassium silicate refractory binders.

9. The weld backing ring of claim 1, further comprising spacers positioned about a posterior face of the first metal cylinder.

10. A pipe section of a pipeline, the pipeline having a passage therethrough for transporting fluids between locations, the pipe section comprising:
a tubular member having a tubular section at each end, the tubular section weldably connectable to a tubular section of an adjacent pipe section;
a first metal cylinder having a tubular body positionable in the tubular section and coaxially secured therein, the first metal cylinder having a stepped external surface defining a ring shaped anterior portion and a ring shaped raised posterior portion with a step therebetween, the anterior portion having an anterior face positioned about the end of the tubular section for abutting engagement with a corresponding anterior face of a first metal cylinder of an adjacent tubular member of the pipeline, the posterior portion having a larger diameter than the anterior portion to define an insulation pocket between an external surface of the anterior portion and an internal surface of the tubular section when positioned in the tubular section, the insulation pocket having an open end about an anterior face of the tubular section and a terminal end adjacent the step, an external surface of the raised posterior portion positioned in one of engagement and non-engagement with the internal surface of the tubular section when the first metal cylinder is secured in the tubular section; and
an insulation layer positioned on the external surface of the first metal cylinder for insertion into the tubular section with the first metal cylinder, the insulation layer having a posterior end positioned against the step of the first metal cylinder, the insulation layer having an anterior end positioned about the end of the tubular section for abutting engagement with a corresponding anterior end of a insulation layer of the adjacent tubular member, the insulation layer comprising a tubular metal section insulating material positioned in the insulation pocket to define a protective barrier between the first metal cylinder and the tubular member when installed in the tubular section whereby the tubular member is protected from heat during welding of the tubular member to the adjacent tubular member; and
a second metal cylinder positioned between the insulation layer and the internal surface of the tubular section;
wherein the first metal cylinder has a first thickness at the posterior end, wherein the first metal cylinder and the insulation layer have a second thickness at an anterior end, the first thickness is greater than the second thickness;
wherein the first metal cylinder has an axial length, the first thickness extends along a first portion of the axial length and the second thickness extend along a second portion of the axial length, the second portion occupying a greater portion of the axial length than the first portion; and
wherein the second metal cylinder is positioned along the stepped external surface of the posterior portion of the first metal cylinder and an external surface of the insulation layer.

11. The pipe section of claim 10, wherein the pipe section has a constant inner and outer diameter, with a bevel at each end of the pipe section.

12. The pipe section of claim 10, wherein the second metal cylinder has an anterior end portion substantially flush with the anterior end portion of the first metal cylinder.

* * * * *